(12) United States Patent
Iwayama et al.

(10) Patent No.: US 9,635,211 B2
(45) Date of Patent: Apr. 25, 2017

(54) IMAGE READING APPARATUS

(71) Applicant: PFU LIMITED, Ishikawa (JP)

(72) Inventors: Akira Iwayama, Ishikawa (JP); Masanari Takabatake, Ishikawa (JP); Masahiko Kobako, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 15/360,104

(22) Filed: Nov. 23, 2016

(65) Prior Publication Data

US 2017/0078514 A1 Mar. 16, 2017

Related U.S. Application Data

(63) Continuation of application No. PCT/JP2014/071391, filed on Aug. 13, 2014.

(51) Int. Cl.
*H04N 1/04* (2006.01)
*H04N 1/203* (2006.01)
(Continued)

(52) U.S. Cl.
CPC ......... *H04N 1/2032* (2013.01); *G06T 1/0007* (2013.01); *H04N 1/107* (2013.01);
(Continued)

(58) Field of Classification Search
CPC .... H04N 1/2032; H04N 1/1065; H04N 1/113; H04N 1/107; H04N 2201/0081;
(Continued)

(56) References Cited

U.S. PATENT DOCUMENTS 5,640,252 A * 6/1997 Turner .................. G03B 27/62
358/497
2004/0047009 A1 3/2004 Taylor et al.

FOREIGN PATENT DOCUMENTS

JP 58-142665 A 8/1983
JP 08-190620 A 7/1996
(Continued)

OTHER PUBLICATIONS

[Online] Image Access, Bookeye4, 2013 Retrived on Aug. 9, 2014, Retrieved from Internet: ,URL: http://www.imageaccess.com/bookeye4.shtml>.

(Continued)

*Primary Examiner* — Houshang Safaipour
(74) *Attorney, Agent, or Firm* — McDermott Will & Emery LLP

(57) ABSTRACT

A image reading apparatus includes a first placement unit, a second placement unit, a first reading unit, a second reading unit, a rotating mechanism, and a switch-over mechanism that switches over the first placement unit and the second placement unit between a horizontal state and an inclined state. The rotating mechanism rotates the first reading unit and the second reading unit, so that, in the horizontal state, the first image reading unit and the second image reading unit read a medium placed on the first placement unit and a medium placed on the second placement unit respectively, and, in the inclined state, the first image reading unit and the second image reading unit read a medium placed on the second placement unit and a medium placed on the first placement unit respectively.

4 Claims, 23 Drawing Sheets

(51) Int. Cl.
*G06T 1/00* (2006.01)
*H04N 1/10* (2006.01)
*H04N 1/113* (2006.01)
*H04N 1/107* (2006.01)

(52) U.S. Cl.
CPC ........... *H04N 1/1065* (2013.01); *H04N 1/113* (2013.01); *H04N 2201/0081* (2013.01); *H04N 2201/0422* (2013.01); *H04N 2201/0434* (2013.01); *H04N 2201/0436* (2013.01); *H04N 2201/0448* (2013.01); *H04N 2201/0456* (2013.01); *H04N 2201/0458* (2013.01)

(58) Field of Classification Search
CPC ... H04N 2201/0422; H04N 2201/0434; H04N 2201/0436; H04N 2201/0456
USPC .................................. 358/497, 474, 498, 496
See application file for complete search history.

(56) References Cited

FOREIGN PATENT DOCUMENTS

| | | |
|---|---|---|
| JP | 2914260 B2 | 6/1999 |
| JP | 11-298688 A | 10/1999 |
| JP | 2005-086443 A | 3/2005 |
| JP | 2006-510238 A | 3/2006 |
| JP | 2006-166378 A | 6/2006 |
| JP | 2007-082005 A | 3/2007 |

OTHER PUBLICATIONS

International Search Report and Written Opinion dated Oct. 14, 2014, issued in International Application No. PCT/JP2014/071391 (w/ partial English translation).

* cited by examiner

IMAGE READING APPARATUS

CROSS-REFERENCE TO RELATED APPLICATION(S)

This application is a continuation of International Application No. PCT/JP2014/071391, filed on Aug. 13, 2014, the entire contents of which are incorporated herein by reference.

FIELD

The embodiments discussed herein are related to an image reading apparatus.

BACKGROUND

In recent years, digitalization of media, in particular, bound media, such as books and magazines, has been demanded. Methods of digitalizing bound media include: a method of separating each sheet from a bound medium and reading an image of each sheet by use of a normal image reading apparatus; and a method of reading images of a bound medium by turning over pages of the bound medium without unbinding the bound medium. As to the latter method, an image reading apparatus has been proposed, which reads, at once, a bound medium, which has been opened, and for which pages of the bound medium are turned over manually (for example, in Japanese Laid-open Patent Publication No. 2005-086443, Japanese Patent No. 2914260, Japanese Laid-open Patent Publication No. 2007-082005, and Japanese Laid-open Patent Publication No. 2006-166378).

Further, depending on bound media, placing a bound medium, such as, for example, an old hook, on a horizontal placement table and reading the bound medium may cause the hound medium to be opened too much and may damage the bound medium. Therefore, an image reading apparatus has been proposed, which enables a placement table to be, not only in a horizontal state, but also in an inclined state, where a bound medium is prevented. from being opened too much (for example, in Bookeye4 [online], Image Access, 2013 [retrieved on Aug. 9, 2014], retrieved from the Internet: <URL:http://www.imageaccess.com/bookeye4.shtml>).

When a bound medium is read from a vertical direction with respect to a placement table, change in distance in the vertical direction between the bound medium and an image reading unit that performs reading in an image reading apparatus is small in a horizontal state, but in an inclined state, the change is large. Therefore, when the image reading unit reads the bound medium by the same operation in both the horizontal state and the inclined state of the placement table, the same image quality is difficult to be obtained.

SUMMARY

According to an aspect of an embodiment, a XXXXX includes a placement table, on which a medium is placed, a first reading unit having a first image reading unit that reads an area of a part of the medium placed on the placement table, a second reading unit having a second image reading unit that reads an area of a part of the medium, the area being different from that read by the first image reading unit, a rotating mechanism that rotates the first reading unit and the second reading unit, a first placement surface and a second placement surface that are provided adjacent to each other in an opening direction of the medium, and a switch-over mechanism that switches over the first placement surface and the second placement surface between: a horizontal state where the first placement surface and the second placement surface are on a same horizontal plane, and an inclined state where opposite end portions of the first placement surface and second placement surface are closer to the first reading unit and the second reading unit than close end portions of the first placement surface and second placement surface, the close end portions close to each other in the opening direction of the medium, the opposite end portions opposite to the close end portions, wherein the rotation mechanism rotates the first reading unit around a first rotation axis, as viewed in a direction orthogonally intersecting the opening direction of the medium, so that the first reading unit is positioned between a first horizontal position and a first inclined position, the first horizontal position, where a perpendicular line of the first placement surface in the horizontal state is parallel to a first optical axis of the first image reading unit, the first optical axis between the first reading unit and the placement table, and where the first image reading unit reads at least the medium opposite to the first placement surface in the horizontal state, the first inclined position where a perpendicular line of the second placement surface in the inclined state is parallel to the first optical axis and where the first image reading unit reads at least the medium opposite to the second placement surface in the inclined state, and rotates the second reading unit around a second rotation axis, as viewed in a direction orthogonally intersecting the opening direction of the medium, so that the second reading unit is positioned between a second horizontal position and a second inclined position, the second horizontal position, where the perpendicular line of the second placement surface in the horizontal state is parallel to a second optical axis of the second image reading unit, the second optical axis between the second reading unit and the placement table, and where the second image reading unit reads at least the medium opposite to the second placement surface in the horizontal state, the second inclined position where the perpendicular line of the first placement surface in the inclined state is parallel to the second optical axis and where the second image reading unit reads at least the medium opposite to the first placement surface in the inclined state, and an area read by the first image reading unit partially overlap with an area read by the second image reading unit in the horizontal state and the inclined state of the placement table.

The object and advantages of the technique will be realized and attained by means of the elements and combinations particularly pointed out in the claims.

It is to be understood that both the foregoing general description and the following detailed description are exemplary and explanatory and are not restrictive of the technique, as claimed.

DESCRIPTION OF EMBODIMENTS

Preferred embodiments of the present disclosure will be explained with reference to accompanying drawings. The present disclosure is not limited by embodiments described below. Further, components in the following embodiments include those easily expected by persons skilled in the art or those that are substantially the same.

[a] First Embodiment

Figure 1:
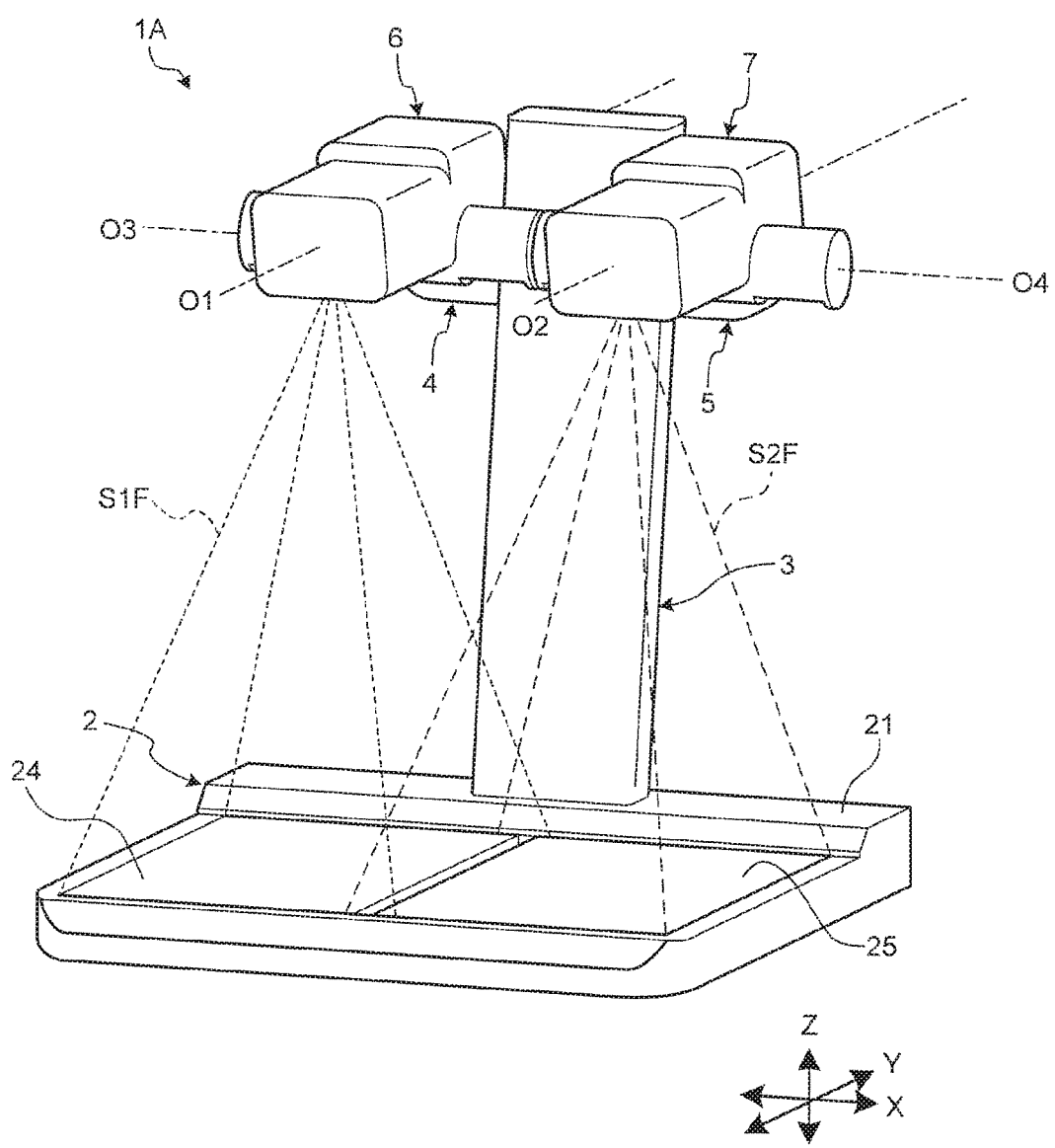
FIG. 1 is a perspective view of an image reading apparatus according to a first embodiment in a horizontal state thereof.
Figure 2:
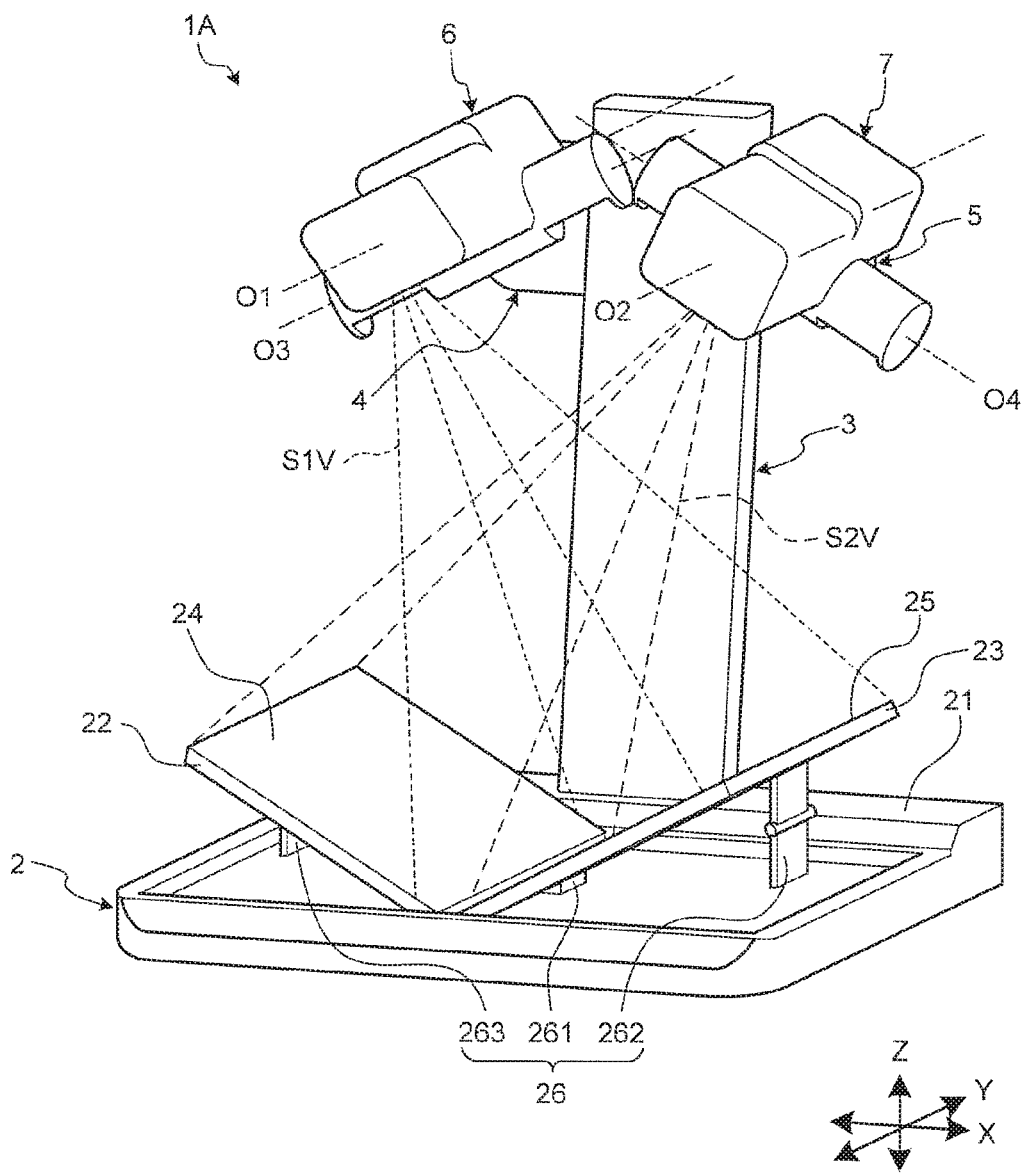
FIG. 2 is a perspective view of the image reading apparatus according to the first embodiment in an inclined state thereof.
Figure 3:
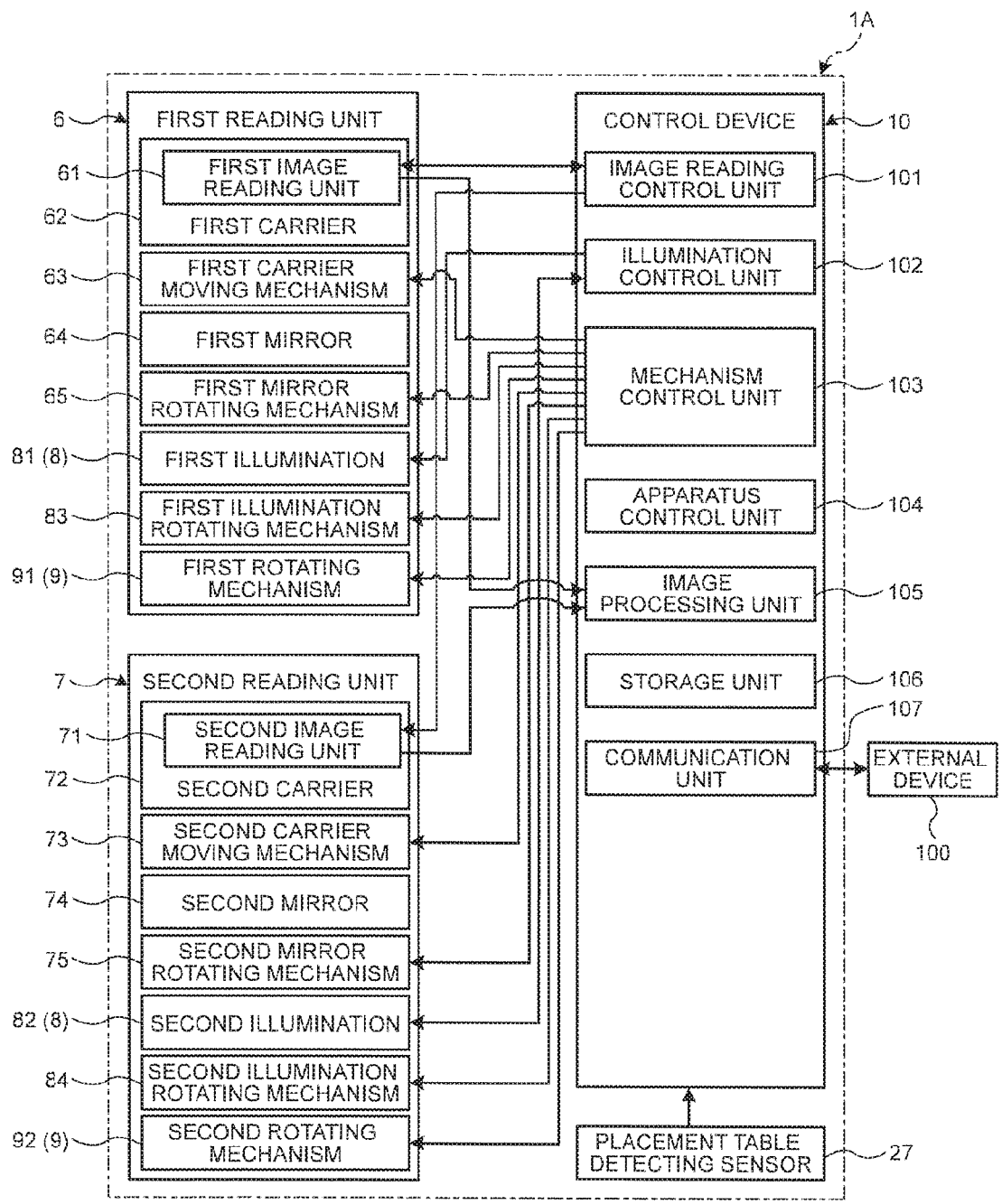
FIG. 3 is a block diagram of the image reading apparatus according to the first embodiment.
Figure 4:
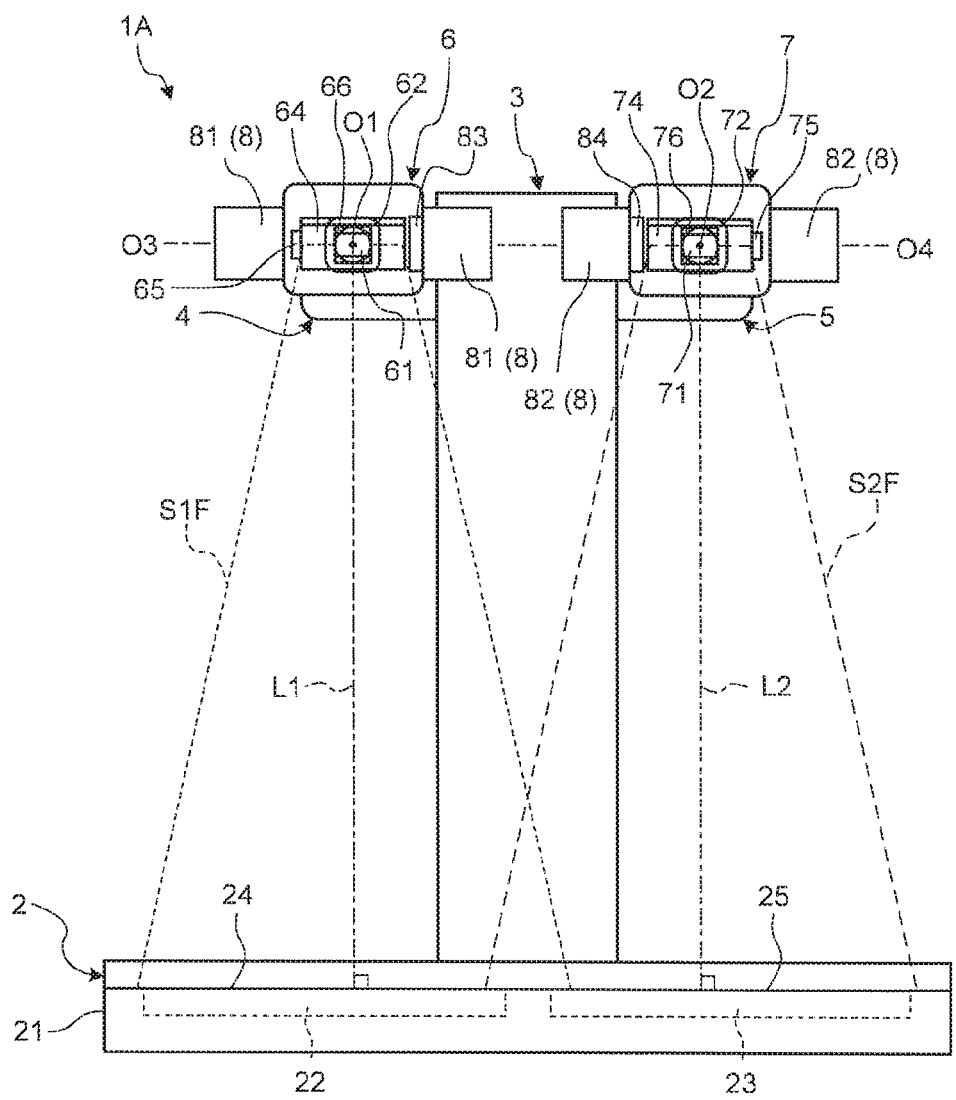
FIG. 4 is a front view of the image reading apparatus according to the first embodiment.
Figure 4:
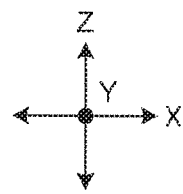
Figure 5:
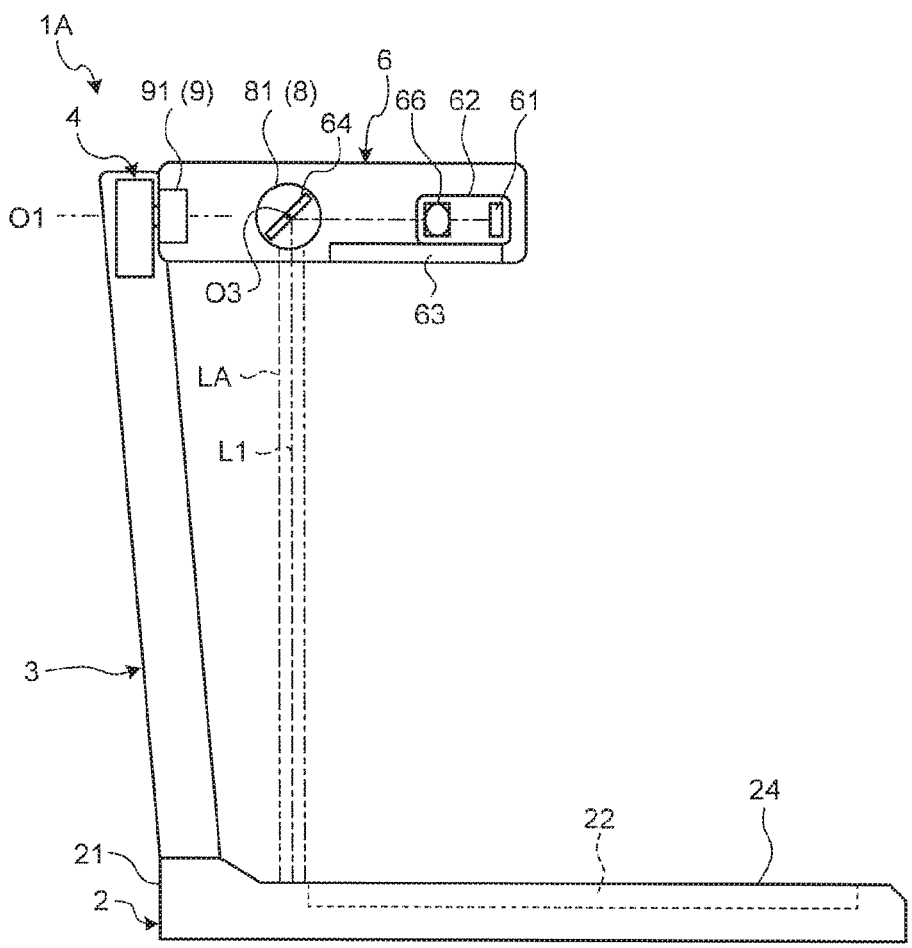
FIG. 5 is a side view of the image reading apparatus according to the first embodiment.
Figure 5:
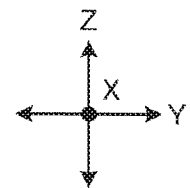
Figure 6:
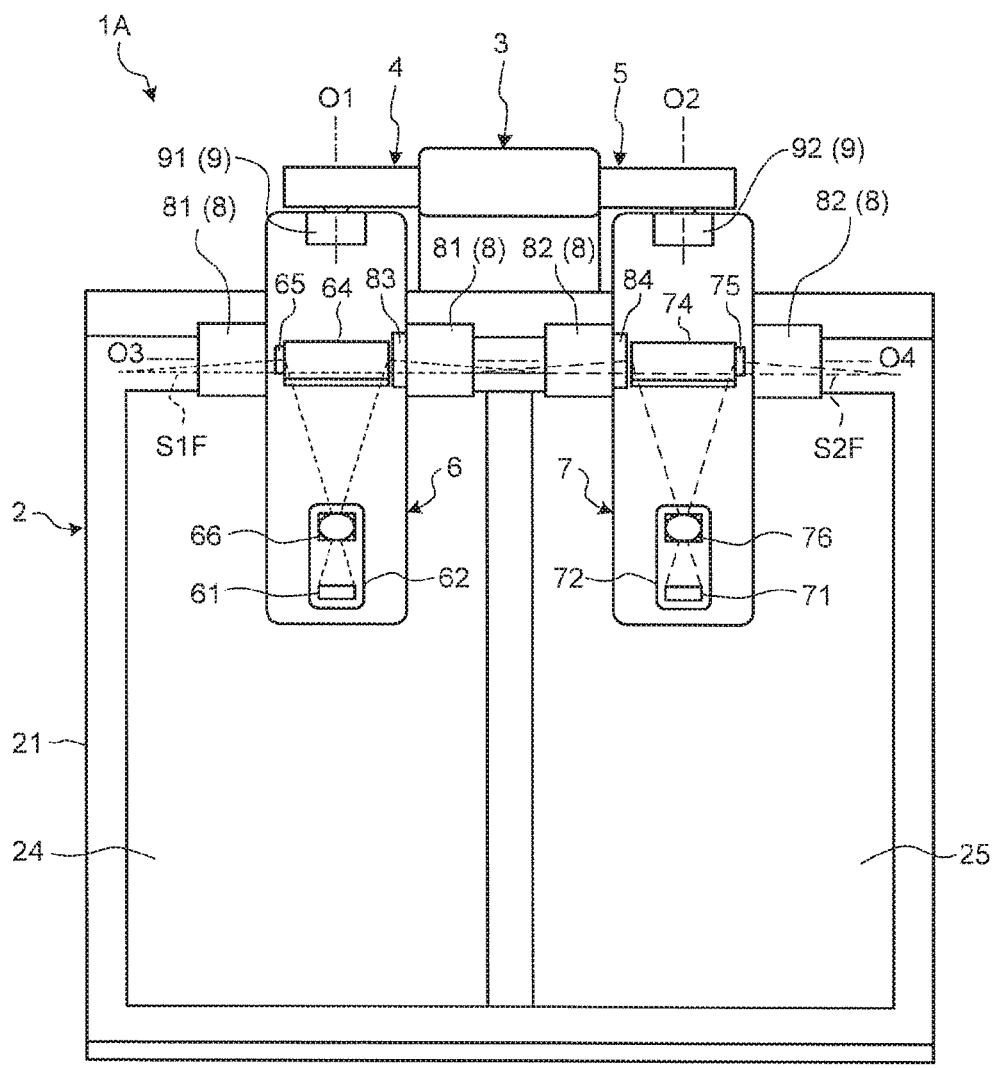
FIG. 6 is a plan view of the image reading apparatus according to the first embodiment.
Figure 7:
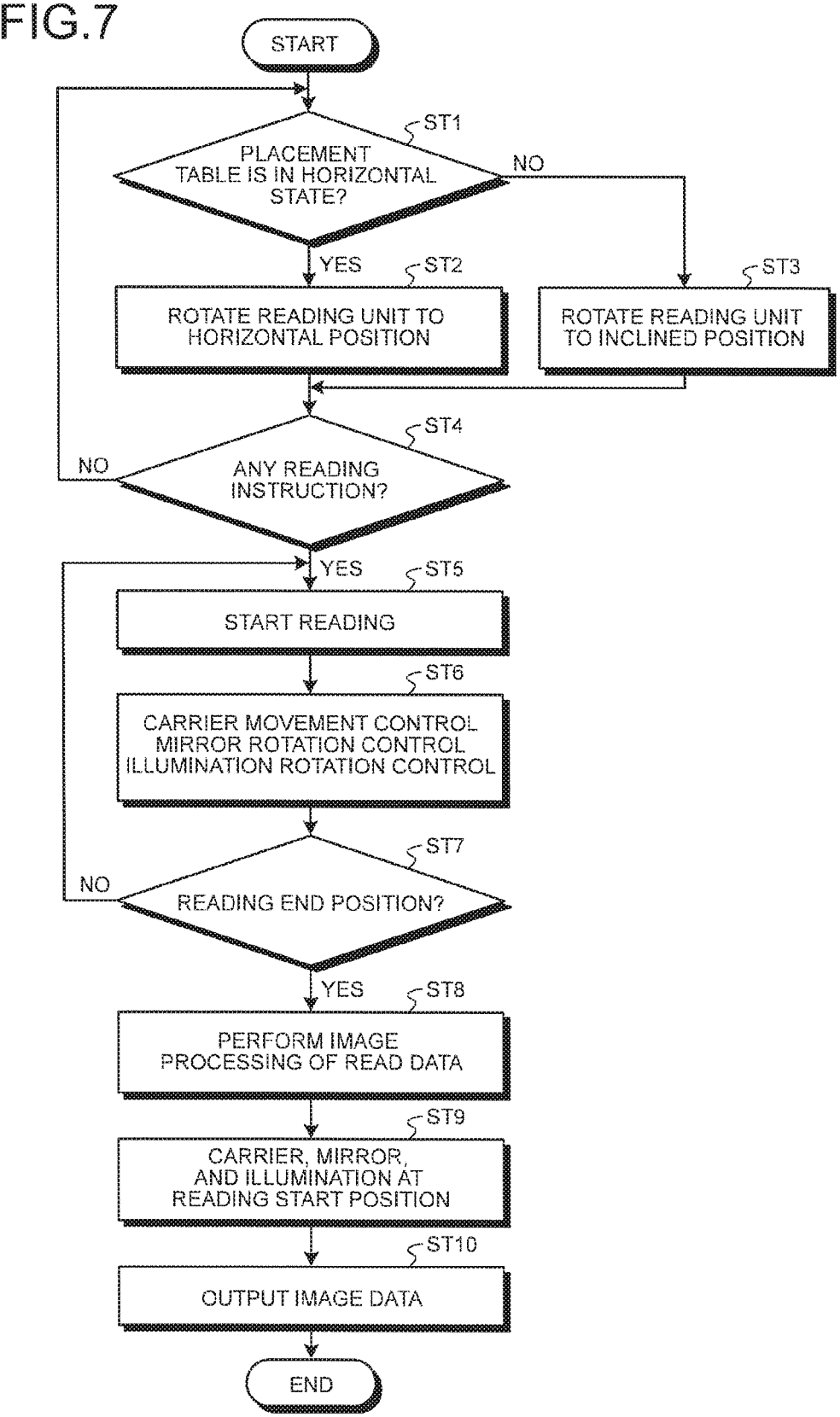
FIG. 7 is a flow diagram of an operation of the image reading apparatus according to the first embodiment.
Figure 8:
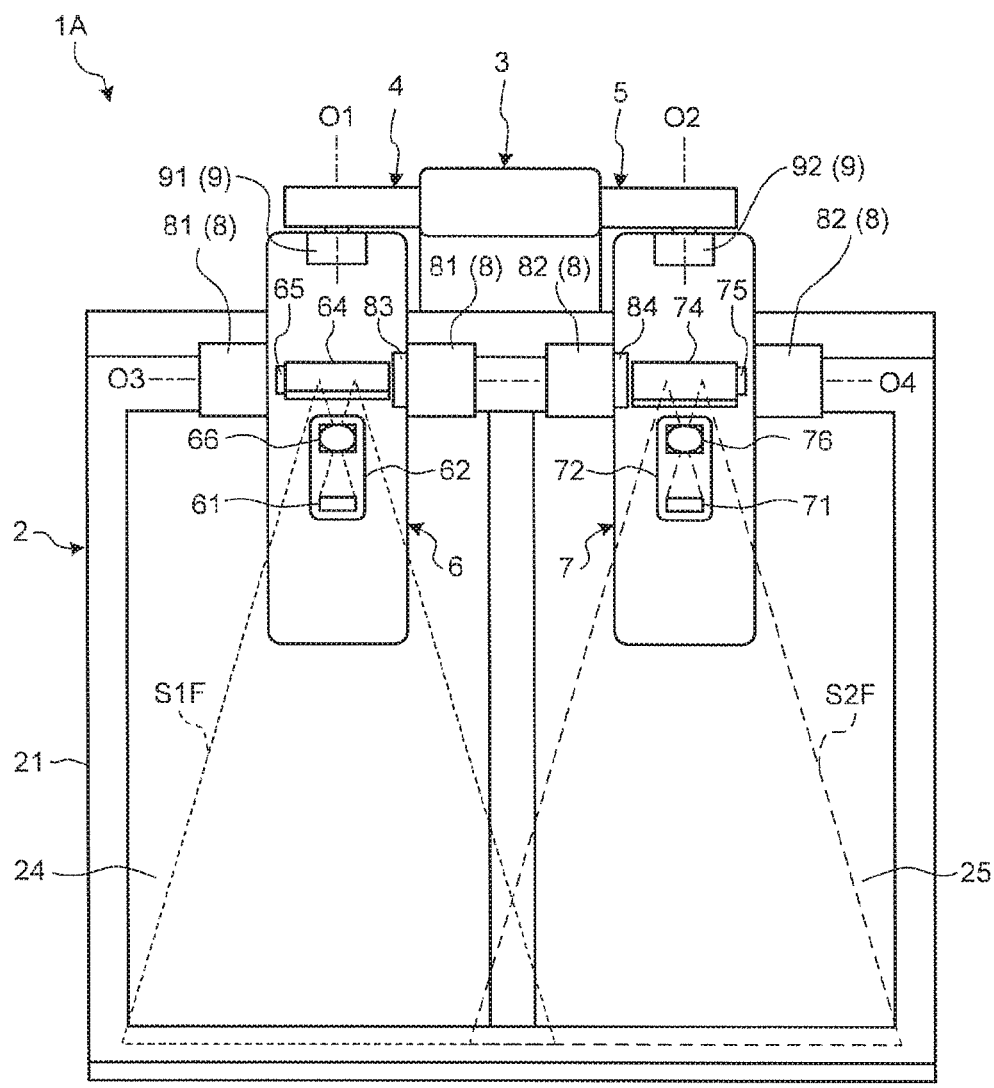
FIG. 8 is an explanatory diagram of the operation of the image reading apparatus according to the first embodiment.
Figure 8:
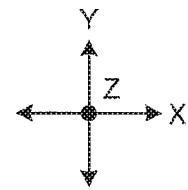
Figure 9:
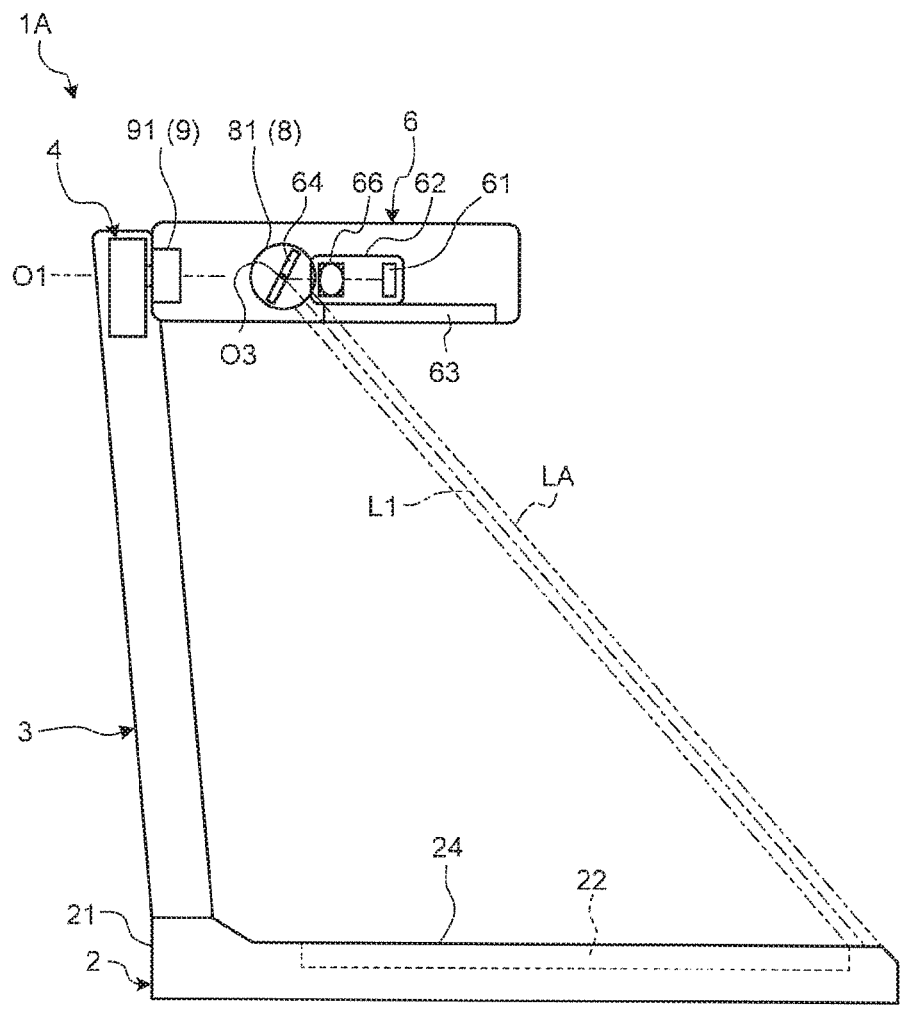
FIG. 9 is an explanatory diagram of the operation of the image reading apparatus according to the first embodiment.
Figure 10:
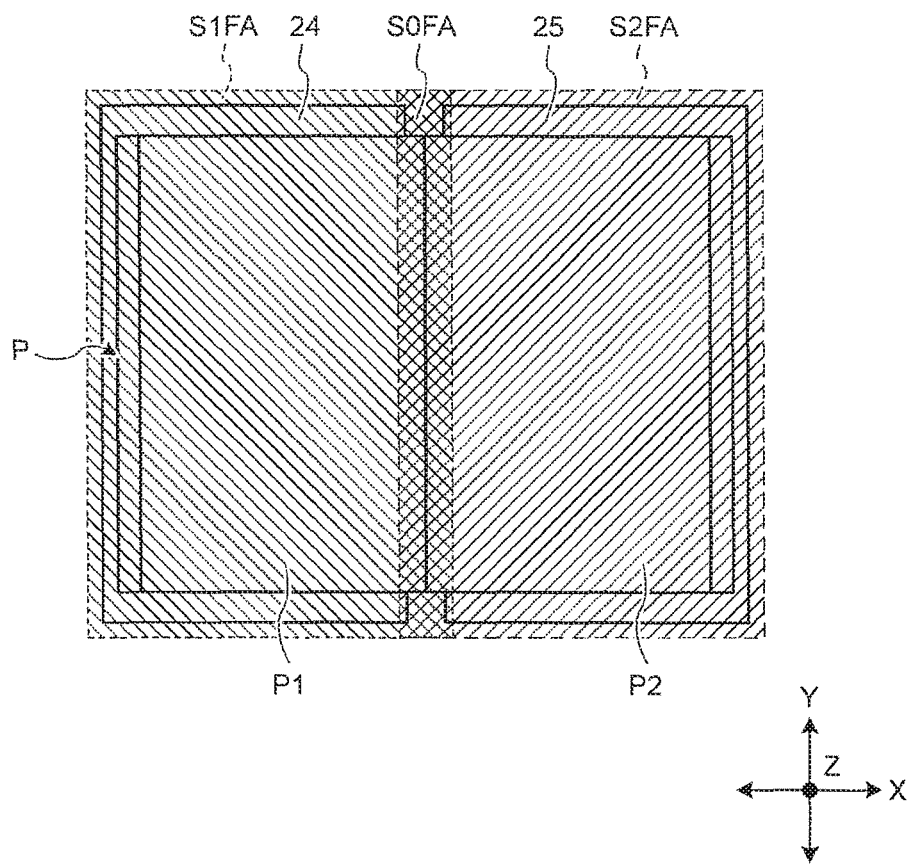
FIG. 10 is an explanatory diagram of read areas in the horizontal state of the image reading apparatus according to the first embodiment.
Figure 11:
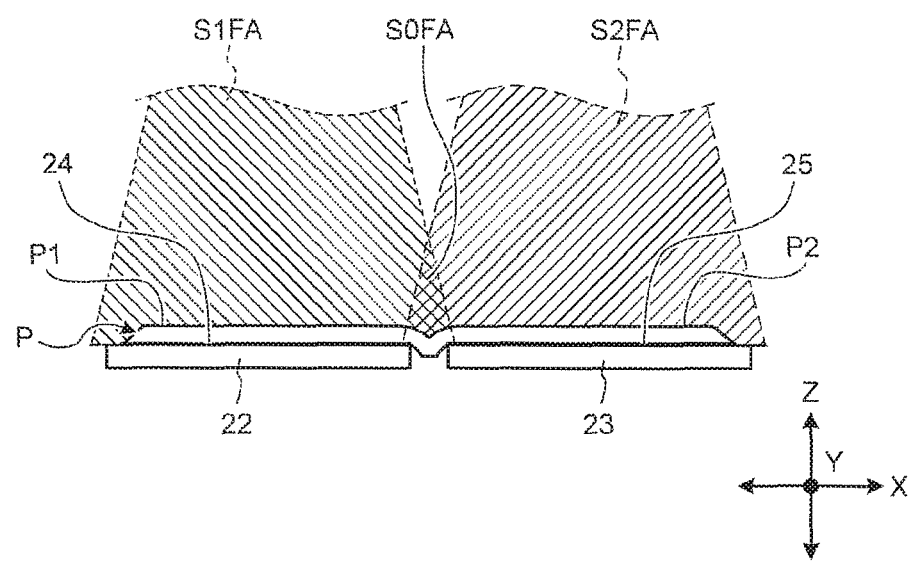
FIG. 11 is an explanatory diagram of the read areas in the horizontal state of the image reading apparatus according to the first embodiment.
Figure 12:
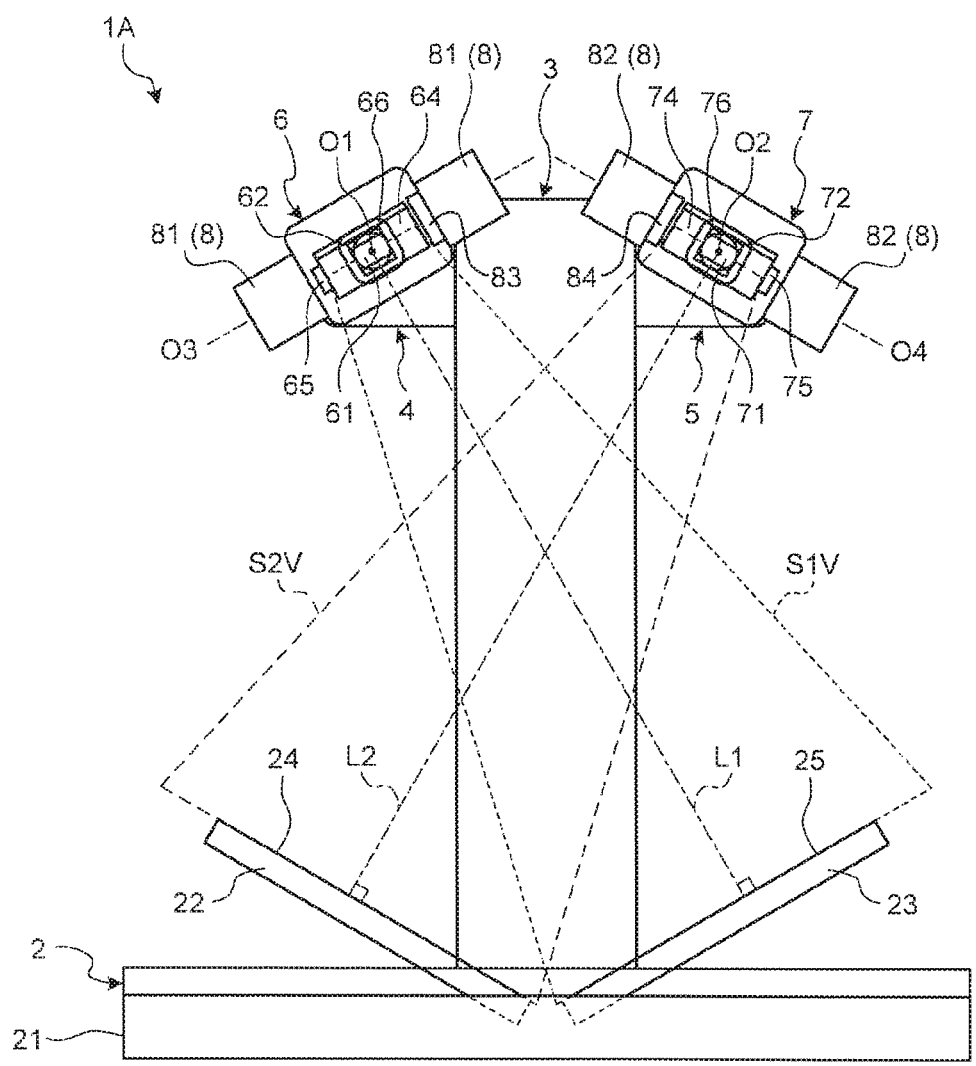
FIG. 12 is an explanatory diagram of the operation of the image reading apparatus according to the first embodiment.
Figure 12:
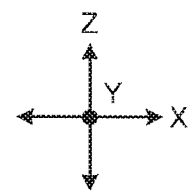
Figure 13:
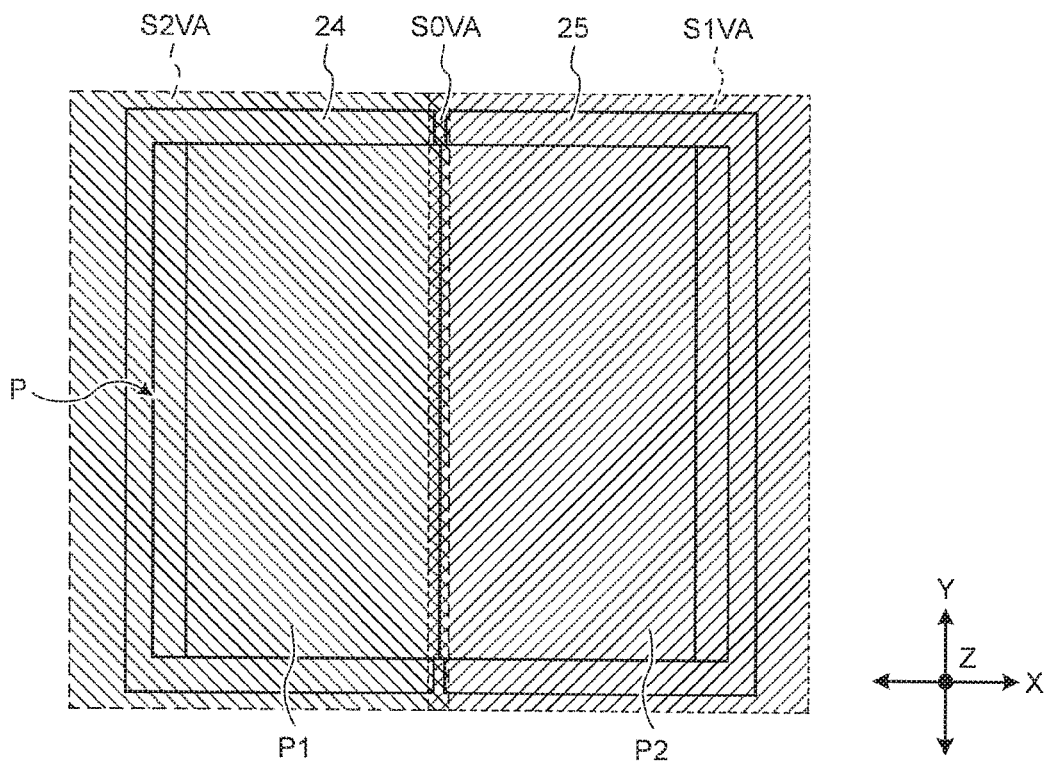
FIG. 13 is an explanatory diagram of read areas in the inclined state of the image reading apparatus according to the first embodiment.
Figure 14:
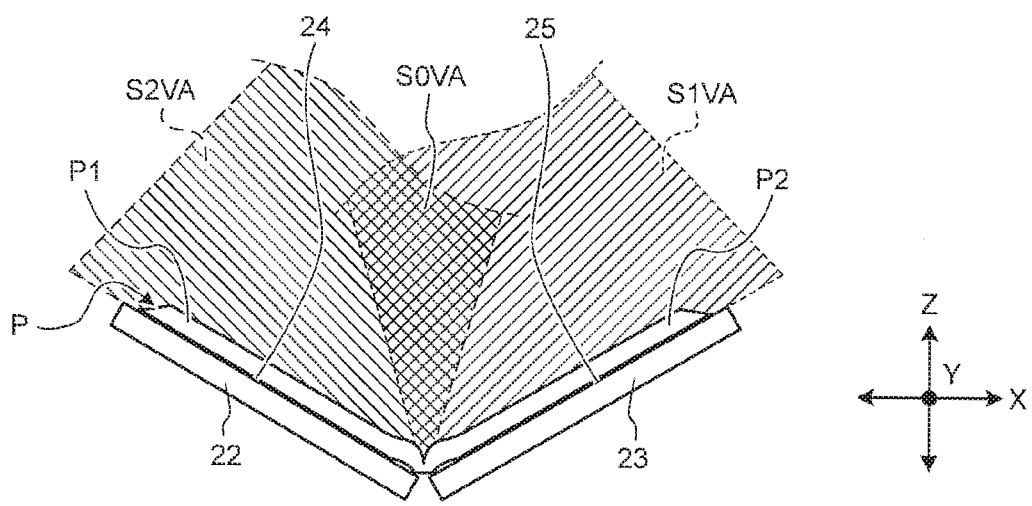
FIG. 14 is an explanatory diagram of the read areas in the inclined state of the image reading apparatus according to the first embodiment.

FIG. 1 is a perspective view of an image reading apparatus according to a first embodiment in a horizontal state thereof. FIG. 2 is a perspective view of the image reading apparatus according to the first embodiment in an inclined state thereof. FIG. 3 is a block diagram, of the image reading apparatus according to the first embodiment. FIG. 4 is a front view of the image reading apparatus according to the first embodiment. FIG. 5 is a side view of the image reading apparatus according to the first embodiment. FIG. 6 is a plan view of the image reading apparatus according to the first embodiment. FIG. 7 is a flow diagram of an operation of the image reading apparatus according to the first embodiment. FIG. 8 is an explanatory diagram of the operation of the image reading apparatus according to the first embodiment. FIG. 9 is an explanatory diagram of the operation of the image reading apparatus according to the first embodiment. FIG. 10 is an explanatory diagram of read areas in the horizontal state of the image reading apparatus according to the first embodiment. FIG. 11 is an explanatory diagram of the read areas in the horizontal state of the image reading apparatus according to the first embodiment. FIG. 12 is an explanatory diagram of the operation of the image reading apparatus according to the first embodiment. FIG. 13 is an explanatory diagram of read areas in the inclined state of the image reading apparatus according to the first embodiment. FIG. 14 is an explanatory diagram of the read areas in the inclined state of the image reading apparatus according to the first embodiment. In the drawings, a width direction of the image reading apparatus will be illustrated as an X-direction, a depth direction orthogonally intersecting the width direction on a horizontal plane as a Y-direction, and a vertical direction orthogonally intersecting the width direction and the depth direction as a Z-direction. FIG. 3 is a functional block diagram illustrating, in blocks, functions that the image reading apparatus according to the first embodiment has FIG. 4 to FIG. 6 and FIG. 8 to FIG. 26 schematically illustrate each component for explanation of functions of image reading apparatuses according to the embodiments.

As illustrated in FIG. 10, FIG. 11, FIG. 13, and FIG. 14, an image reading apparatus 1A according to the first embodiment reads a medium, in particular, a bound medium P, which is formed by plural sheets of paper media being bound by a binding unit, by: individually reading spread pages of the bound medium P, that is, a first spread page P1 and a second spread page P2, while pages of the bound medium P are manually turned over; combining respective read data respectively corresponding to the respective spread pages P1 and P2; and generating image data corresponding to both of the spread pages P1 and P2 of the bound medium P. The bound medium P is not particularly limited, and is, for example: a book; a magazine; documents formed plural sheets of paper bound with a staple, a clip, or the like; or the like. Hereinafter, the same signs in the respective first to sixth embodiments refer to the same components, and thus description thereof will be omitted or simplified.

The image reading apparatus 1A includes, as illustrated in FIG. 1 to FIG. 3, a placement table 2, an arm 3, a first supporting unit 4, a second supporting unit 5, a first reading unit 6, a second reading unit 7, an illumination 8, a rotating mechanism 9, and a control device 10. In the image reading apparatus 1A, an opening direction of the bound medium P is referred to as the width direction, an extending direction of a bound portion as the depth direction, the extending direction orthogonally intersecting the opening direction in a horizontal planar view thereof, and a thickness direction orthogonally intersecting the width direction and the depth direction as the vertical direction. The image reading apparatus 1A according to this embodiment is configured to have, as its largest target to be read, the predetermined bound medium P, in which each sheet of paper media has a predetermined size, and which has a predetermined thickness.

The placement table 2 is for placing the bound medium P thereon, and includes: a placement table main body unit 21, a first placement unit 22, a second placement unit 23, and a switch-over mechanism 26, which are illustrated in FIG. 2; and a placement table detecting sensor 27, which is illustrated in FIG. 3.

The placement table main body unit 21 is a portion that comes into contact with a surface, on which the image reading apparatus 1A is installed, and as illustrated in FIG. 10, is formed with a size enabling, when the bound medium P is opened, the bound medium P in the opened state to be placed inside the placement table main body unit 21 as viewed in the vertical direction.

The first placement unit 22 and the second placement unit 23 are arranged, as illustrated in FIG. 1, on the placement table main body unit 21 and adjacent to each other in the opening direction of the bound medium P. The first placement unit 22 is formed in a flat plate shape, and has a first placement surface 24 formed thereon, opposite to the first reading unit 6 in the vertical direction. The second placement unit 23 is formed in a flat plate shape, and has a second placement surface 25 formed thereon, opposite to the second reading unit 7 in the vertical direction. As illustrated in FIG. 10, the first placement surface 24 according to this embodiment is a flat surface, and a part of the bound medium P is placed on the first placement surface 24 such that the first placement surface 24 is opposite to the first spread page P1 in the vertical direction. The second placement surface 25 according to this embodiment is a flat surface, and a part of the bound medium P is placed on the second placement surface 25 such that the second placement surface 25 is opposite to the second spread page 22 in the vertical direction. That is, the first placement surface 24 and the second placement surface 5 are provided adjacent to each other in the opening direction of the bound medium P. The first placement unit 22 and the second placement unit 23 are arranged on the placement table 2 with a gap between the first placement unit 22 and the second placement unit 23 when the placement table 2 is in a horizontal state and an inclined state. Therefore, in a state where the bound medium, P has been placed on the placement table 2, the bound portion is able to be inserted, in this gap. That is, on the placement table 2, the bound portion of the bound medium P is positioned at a position lower than, that is, below in the vertical direction, both of opening direction end portions of the bound medium P in the opened state. Therefore, as compared to a case where the bound medium P in the opened, state is placed cc the table 2 without a gap formed therein, a portion of the hound medium P, the portion near the bound portion, is able to be prevented from rising upward in the vertical direction, and positional displacement of the bound medium P with respect to the placement table 2 is able to be prevented.

The switch-over mechanism 26 switches over the first placement surface 24 and the second placement surface 25 between a horizontal state and an inclined state. The switch-over between the horizontal state and inclined state of the placement table 2 by the switch-over mechanism 26 is performed by a user, that is, manually. The switch-over mechanism 26 includes, as illustrated in FIG. 2, a rotation support unit 261, and holding mechanisms 262 and 263. The rotation support unit 261 causes the first placement unit 22 and the second placement unit 23 to rotate in the width direction, based on a rotation axis, which extends in the middle of the first placement unit 22 and the second placement unit 23 and in the depth direction, and which is not illustrated. As illustrated in FIG. 1 and FIG. 4, the horizontal state of the placement table 2 refers to a state where the first placement unit 22 and the second placement unit 23 are in a horizontal position, that is, the first placement surface 24 and the second placement surface 25 are on the same horizontal plane (in a state where an angle formed between the first placement surface 24 and the second placement surface 25 is 180 degrees). In contrast, as illustrated in FIG. 2 and FIG. 12, the inclined state of the placement table 2 refers to a state where the first placement unit 22 and the second placement unit 23 are V-shaped as viewed in the depth direction, that is, opposite end portions of the first placement surface 24 and the second placement surface 25 are closer to the two reading units 6 and 7 than close end portions of the first placement surface 24 and the second placement surface 25, the close end portions close to each other in the opening direction of the bound medium P, the opposite end portions opposite to the close end portions (in a state where the angle formed between the first placement surface 24 and the second placement surface 25 is less than 180 degrees). Further, the switch-over mechanism 26 sets positions of the respective placement surfaces 24 and 25 in the inclined state of the placement table 2, such that a distance of a first perpendicular line drawn from a first rotation axis O1, which will be described later, to the first placement surface 24 in the horizontal state of the placement table 2 is equal to a distance of a second perpendicular line drawn from the first rotation axis O1 to the second placement surface 2 in the inclined state of the placement table 2, and a distance of a third perpendicular line drawn from a second rotation axis O2, which will be described later, to the second placement surface 25 in the horizontal state of the placement table 2 is equal to a distance of a fourth perpendicular line drawn from the second rotation axis O2 to the first placement surface 24 in the inclined state of the placement table 2. The angle formed between the first placement surface 24 and the second placement surface 25 in the inclined state of the placement table 2 is any angle less than 180 degrees, and is preferably 165 degrees, 150 degrees, 135 degrees, 120 degrees, 105 degrees, or the like. The holding mechanisms 262 and 263 hold the inclination of the first placement surface 24 and the second placement surface 25 by maintaining the state of the first placement unit 22 and second placement unit 23 in the inclined state of the placement table 2. Configurations of the holding mechanisms 262 and 263 are not particularly limited, but as illustrated in FIG. 2, preferably, each of the holding mechanisms 262 and 263 includes a hinge mechanism and is accommodated inside the placement table main body unit 21 in the horizontal state of the placement table 2.

As illustrated in FIG. 3, the placement table detecting sensor 27 is a sensor that detects the state of the placement table 2. The placement table detecting sensor 27 detects whether the placement table 2 is in the horizontal state or the inclined state. The placement table detecting sensor 27 according to this embodiment detects a positional change of the first placement surface 24 or the second placement surface 25 between the horizontal state and the inclined state. The placement table detecting sensor 27 may be, for example: a switch sensor, which detects that the switch sensor contacts the first placement surface 24 or the second placement surface 25 in the horizontal state and does not contact them in the inclined state; an optical sensor, which detects that the inside of the placement table main body unit 21 becomes dark in the horizontal state and the inside of the placement table main body unit 21 becomes bright in the inclined state; or a height sensor, which detects a change in height in the vertical direction between the horizontal state and the inclined state of the first placement surface 24 or the second placement surface 25. The placement table detecting sensor 27 is connected to the control device 10.

As illustrated in FIG. 1 and FIG. 2, the arm 3 causes the two reading units 6 and 7 to be opposite to the placement table 2 in the vertical direction, by supporting the two reading units 6 and 7. The arm 3 according to this embodiment has a flat plate shape, and is formed to extend upwards in the vertical direction from a deep side of the placement table main body unit 21, the deep side deeper in the depth direction than the two placement surfaces 24 and 25.

The first supporting unit 4 freely rotatably supports the first reading unit 6. The first supporting unit 4 is formed to protrude, from a portion of the arm 3, the portion upper in the vertical direction, towards one side in the width direction (leftward in FIG. 1). The first supporting unit 4 freely rotatably supports the first reading unit 6, around the first rotation axis O1.

The second supporting unit 5 freely rotatably supports the second reading unit 7. The second supporting unit 5 is formed to protrude, from a portion of the arm 3, the portion upper in the vertical direction, towards the other side in the width direction (rightward in FIG. 2). The second supporting unit 5 freely rotatably supports the second reading unit 7, around the second rotation axis O2.

The first reading unit 6 is arranged opposite to the first placement surface 24 of the placement table 2 in the vertical direction, and as illustrated in FIG. 3 to FIG. 6, includes a first image reading unit 61, a first carrier 62, a first carrier moving mechanism 63, a first mirror 64, a first mirror rotating mechanism 65, and a lens 66. The first reading unit 6 is formed to extend to a shallower side in the depth direction from the first supporting unit 4. The first reading unit 6 rotates around the first rotation axis O1, so that the first reading unit 6 is positioned between a first horizontal position and a first inclined position, which will be described later.

The first image reading unit 61 reads an area of a part of the bound medium P placed on the placement table 2, and is, for example, a linear CCD sensor formed of plural imaging elements, which are arranged in the width direction in one or more rows as viewed in the depth direction in the first horizontal position, and which are not illustrated. The first image reading unit 61 is, as illustrated in FIG. 3, connected to an image reading control unit 101 and an image processing unit 105. In a case where a first optical axis L1 (an optical axis directed to the placement table 2) of the first image reading unit 61 is viewed in a direction orthogonally intersecting the opening direction of the bound medium P, that is, in the depth direction, as illustrated in FIG. 4, the first optical axis L1 is parallel to a perpendicular line of the first placement surface 24 in the horizontal state when the first reading unit 6 is in the first horizontal position. Further, in a case where the first optical axis L1 of the first image reading unit 61 (the optical axis directed to the placement table 2) is viewed in the depth direction, as illustrated in FIG. 12, the first optical axis L1 is parallel to a perpendicular line of the second placement surface 25 in the inclined state when the first reading unit 6 is in the first inclined position. Furthermore, a read region S1F of the first image reading unit 61 in the first horizontal position and the horizontal state includes, as illustrated in FIG. 4, the first placement surface 24. That is, a read area S1FA formed by the read region S1F of the first image reading unit 61 in the first horizontal position and the horizontal state includes, as illustrated in FIG. 10 and FIG. 11, the first spread page P1 of the bound medium P. In contrast, a read region S1V of the first image reading unit 61 in the first inclined position and the inclined state includes, as illustrated in FIG. 12, the second placement surface 25. That is, a read area S1VA formed by the read region S1V of the first image reading unit 61 in the first inclined position and the inclined state includes, as illustrated in FIG. 13 and FIG. 14, the second spread page P2 of the bound medium P.

The first carrier 62 forms a first optical path length changing mechanism, and as illustrated in FIG. 4 and FIG. 5, accommodates therein the first image reading unit 61. The first carrier 62 according to this embodiment also accommodates therein the lens 66 arranged on the first optical, axis L1. The first carrier 62 is supported freely movably in the extending direction of the first optical axis L1, that is, in the depth direction, with respect to the first reading unit 6. Therefore, by the first carrier 62 moving in the depth direction, the position of the first image reading unit 61 is changed, and the optical path length between the first image reading unit 61 and the first mirror 64 is changed.

The first carrier moving mechanism 63 forms the first optical path length changing mechanism, and moves, in the depth direction, the first carrier 62 supported freely movably in the depth direction. The first carrier moving mechanism 63 reciprocates the first carrier 62 between a reading start position (see FIG. 5) and a position at a deeper side in the depth direction than the reading start position, that is, a reading end position (see FIG. 9) where the optical path length between the first image reading unit 61 and the first mirror 64 becomes shorter. The first carrier moving mechanism 63 has an actuator, which is not illustrated, and reciprocates the first carrier 62 with driving force from the actuator. The first carrier moving mechanism 63 is, as illustrated in FIG. 3, connected to a mechanism control unit 103.

As illustrated in FIG. 5 and FIG. 6, the first mirror 64 changes the direction of the first optical axis L1 of the first image reading unit 61, and is freely rotatably supported with respect to the first reading unit 6. The first mirror 64 according to this embodiment is supported around a third rotation axis O3, which is parallel to the opening direction of the bound medium P in the first horizontal position. The first mirror 64 is positioned at a deeper side in the depth direction than the first image reading unit 61. The first mirror 64 according to this embodiment is arranged at a deeper side in the depth direction than the hound medium P (each of the placement surfaces 24 and 25) placed on the placement table 2 as viewed in the width direction. The first mirror 64 folds back, at the third rotation axis O3, the first optical axis L1 in the depth direction to a shallower side in the depth direction than the first mirror 64, at a lower side in the vertical direction and as viewed in the width direction. Further, by rotating around the third rotation axis O3, the first mirror 64 moves the first optical axis L1 in a direction orthogonally intersecting the opening direction of the bound medium P, that is, in the depth direction.

The first mirror rotating mechanism 65 rotates the first mirror 64 supported freely rotatably around the third rotation axis O3. The first mirror rotating mechanism 65 rotates the first mirror 64, so that the first optical axis L1 moves between a reading start position (see FIG. 5) which is positioned at a deeper side than an end portion of the bound medium P, the end portion at a deep side in the depth direction, and a reading end which is positioned at a shallower side than the end portion of the bound medium P, the end portion at the shallow side in the depth direction. In the reading end position, the optical path length between the first mirror 64 and each of the placement surfaces 24 and 25 is longer than that in the reading start position. The first mirror rotating mechanism 65 has an actuator, which is not illustrated, and rotates the first mirror 64 with driving force from the actuator. The first mirror rotating mechanism 65 is connected to the mechanism control unit 103.

The second reading unit 7 is arranged opposite to the second placement surface 25 of the placement table 2 in the vertical direction, and as illustrated in FIG. 3 to FIG. 6, has a configuration similar to that of the first reading unit 6, and includes a second image reading unit 71, a second carrier 72, a second carrier moving mechanism 73, a second mirror 74, a second mirror rotating mechanism 75, and a lens 76. The second reading unit 7 is formed to extend to a shallower side in the depth direction from the second supporting unit 5. The second reading unit 7 rotates around the second rotation axis O2, so that the second reading unit 7 is positioned between a second horizontal position and a second inclined position, which will be described later.

The second image reading unit 71 reads an area of a part of the bound medium P placed on the placement table 2, and is, for example, a linear CCD sensor formed of plural imaging elements, which are arranged in the width direction in one or more rows as viewed in the depth direction in the second horizontal position and which are not illustrated. The second image reading unit 71 is, as illustrated in FIG. 3, connected to the image reading control unit 101 and the image processing unit 105. In a case where a second optical axis L2 (an optical axis directed to the placement table 2) of the second image reading unit 71 is viewed in a direction orthogonally intersecting the opening direction of the bound medium P, that is, in the depth direction, the second optical axis L2 is parallel to a perpendicular line of the second placement surface 25 in the horizontal state when the second reading unit 7 is in the second horizontal position. Further, in a case where the second optical axis L2 (the optical axis directed to the placement table 2) of the second image reading unit 71 is viewed in the depth direction, as illustrated in FIG. 12, the second optical axis 12 is parallel to a perpendicular line of the first placement surface 24 in the inclined state when the second reading unit 7 is in the second inclined position. Furthermore, read region S2F of the second image reading unit 71 in the second horizontal position and the horizontal state includes, as illustrated in FIG. 4, the second placement surface 25. That is, a read area S2FA formed by the read region S2F of the second image reading unit 71 in the second horizontal position and the horizontal state includes, as illustrated in FIG. 10 and FIG. 11, the second spread page P2 of the bound medium P. In contrast, a read region S2V of the second image reading unit 71 in the second inclined position and the inclined state includes, as illustrated in FIG. 12, the first placement surface 24. That is, a read area S2VA formed by the read region S2V of the second image reading unit 71 in the second inclined position and the inclined state includes, as illustrated in FIG. 13 and FIG. 14, the first spread page P1 of the bound medium P.

The read region S1F or S1V of the first image reading unit 61 includes a part of the read region S2F or S2V of the second image reading unit 71. The read region S1F of the first image reading unit 61 is, as illustrated in FIG. 4, larger than the first placement surface 24 in the opening direction of the bound medium P. A width direction end portion of the read regions S1F, the width direction end portion at the second placement surface 25 side, is positioned at the second placement surface 25 side than the middle of the first placement unit 22 and second placement unit 23 in the width direction. The read region S1V of the first image reading unit 61 is, as illustrated in FIG. 12, larger than the second placement surface 25 in the opening direction of the bound medium P. A width direction end portion of the read region S1V, the width direction end portion at the first placement surface 24 side, is positioned at the first placement surface 24 side than the middle of the first placement unit 22 and second placement unit 23 in the width direction. Further, the read region S2F of the second image reading unit 71 is, as illustrated in FIG. 4, larger than the second placement surface 25 in the opening direction of the bound medium P. A width direction end portion of the read regions S2F, the width direction end portion at the first placement surface 24 side, is positioned at the first placement surface 24 side than the middle of the first placement unit 22 and second placement unit 23 in the width direction. The read region S2V of the second image reading unit 71 is, as illustrated in FIG. 12, larger than the first placement surface 24 in the opening direction of the bound medium P. A width direction end portion of the read regions S2V, the width direction end portion at the second placement surface 25 side, is positioned at the second placement surface 25 side than the middle of the first placement unit 22 and second placement unit 23 in the width direction. Therefore, since the read region S1F or S1V of the first image reading unit 61 and the read region S2F or S2V of the second image reading unit 71 partially overlap each other, first read data that are read and generated by the first image reading unit 61 and second read data that are read and generated by the second image reading unit 71 include mutually overlapping read data.

The second carrier 72 forms a second optical path length changing mechanism, and as illustrated in FIG. 4 and FIG. 5, accommodates therein the second image reading unit 71. The second carrier 72 according to this embodiment also accommodates therein the lens 76 arranged on the second optical axis L2. The second carrier 72 is supported freely movably in the extending direction of the second optical axis L2, that is, in the depth direction, with respect to the second reading unit 7. Therefore, by the second carrier 72 moving in the depth direction, the position of the second image reading unit 71 is changed, and the optical path length between the second image reading unit 71 and the second mirror 74 is changed.

The second carrier moving mechanism 73 forms the second optical path length changing mechanism, and moves, in the depth direction, the second carrier 72 supported freely movably in the depth direction. The second carrier moving mechanism 73 reciprocates the second carrier 72 between a reading start position and a position at a deeper side in the depth direction than the reading start position, that is, a reading end position (see FIG. 9) where the optical path length between the second image reading unit 71 and the second mirror 74 becomes shorter. The second carrier moving mechanism 73 has an actuator, which is not illustrated, and reciprocates the second carrier 72 driving force from the actuator. The second carrier moving mechanism 73 is, as illustrated in FIG. 3, connected to the mechanism control unit 103.

As illustrated in FIG. 6, the second mirror changes the direction of the second optical axis L2 of the second image reading unit 71, and is freely rotatably supported with respect to the second reading unit 7 The second mirror 74 according to this embodiment is supported around a fourth rotation axis O4, which is parallel to the opening direction of the bound medium P in the second horizontal position. The second mirror 74 is positioned at a deeper side in the depth direction than the second image reading unit 71. The second mirror 74 according to this embodiment is arranged at a deeper side in the depth direction than the bound medium P (each of the placement surfaces 24 and 25) placed on the placement table 2 as viewed in the width direction. The second mirror 74 folds back, at the fourth rotation axis O4, the second optical axis L2 in the depth direction to a shallower side in the depth direction than the second mirror 74, at a lower side in the vertical direction and as viewed in the width direction. Further, by rotating around the fourth rotation axis O4, the second mirror 74 moves the second optical axis L2 in a direction orthogonally intersecting the opening direction of the bound medium P, that is, in the depth direction.

The second mirror rotating mechanism 75 rotates the second mirror 74 supported freely rotatably around the fourth rotation axis O4. The second mirror rotating mechanism 75 rotates the second mirror 74, so that the second optical axis L2 moves between a reading start position which is positioned at a deeper side than an end portion of the bound medium P, the end portion at a deep side in the depth direction, and a reading end position which is positioned at a shallower side than the end portion of the bound medium P, the end portion at the shallow side in the depth direction. In the reading end position, the optical path length between the second mirror 74 and each of the placement surfaces 24 and 25 is longer than that in the reading start position. The second mirror rotating mechanism 75 has an actuator, which is not illustrated, and rotates the second mirror 74 with driving force from the actuator. The second mirror rotating mechanism 75 is connected to the mechanism control unit 103.

The illumination 8 irradiates the bound medium P with light, the bound medium P placed on the placement table 2. The illumination 8 according to this embodiment includes, as illustrated in FIG. 3 to FIG. 6, first illuminations 81 provided at the first reading unit 6 side, second illuminations 82 provided at the second reading unit 7 side, a first illumination rotating mechanism 83, and a second illumination rotating mechanism 84. The first illuminations 81 are supported around the third rotation axis O3. The first illuminations 81 according to this embodiment are provided at both of third rotation axis O3 direction end portions of the first reading unit 6. An irradiation range of the first illuminations 81 has a belt shape extending in the width direction, and is set more largely than the read region S1F or S1V in the width direction. The second illuminations 82 are supported around the fourth rotation axis O4. The second illuminations 82 according to this embodiment are provided at both of fourth rotation axis O4 direction end portions of the second reading unit 7. An irradiation range of the second illuminations 82 has a belt shape extending in the width direction, and is set more largely than the read region S2F or S2V in the width direction. The first illuminations 81 and the second illuminations 82 are connected to an illumination control unit 102. The first illumination rotating mechanism 83 rotates the first illuminations 81 supported freely rotatably around the third rotation axis O3. The second illumination rotating mechanism 84 rotates the second illuminations 82 supported freely rotatably around the fourth rotation axis O4. The respective illumination rotating mechanisms 83 and 84 respectively rotate the respective illuminations 81 and 82 between a reading start position (see FIG. 5) and a reading end position (see FIG. 9). The respective illumination rotating mechanisms 83 and 84 rotate the respective illuminations 81 and 82, such that the respective optical axes L1 and L2 (read regions S1F, S1V, S2F, and S2V) changed by the respective mirrors 64 and 74, which rotate between the reading start position and reading end position, are always included in an irradiation region LA of the respective illuminations 81 and 82 upon the rotation. That is, a position on the bound medium P irradiated by the illumination 8 is changed in synchronization with the positional, change of the first optical axis L1 and the second optical axis L2 with respect to the bound medium P. The respective illumination rotating mechanisms 83 and 84 according to this embodiment are formed such that the respective illuminations 81 and 82 rotate with a rotation angle twice a rotation angle of the respective mirrors 64 and 74. The respective illumination rotating mechanisms 83 and 84 respectively have actuators, which are not illustrated, and drive the respective illuminations 81 and 82 with driving force from the respective actuators. Each of the illumination rotating mechanisms 83 and 84 is connected to the mechanism control unit 103.

The rotating mechanism 9 rotates each of the two reading units 6 and 7. The rotating mechanism 9 according to this embodiment includes, as illustrated in FIG. 3 and FIG. 6, a first rotating mechanism 91 and a second rotating mechanism 92. The first rotating mechanism 91 is provided in the first reading unit 6, and rotates the first reading unit 6 around the first rotation axis O1, so that the first reading unit 6 is positioned between the first horizontal position and the first inclined position. The first rotating mechanism 91 positions the first reading unit 6 in the first horizontal position when the placement table 2 is in the horizontal state, and positions the first reading unit 6 in the first inclined position when the placement table 2 is in the inclined state. The first rotating mechanism 91 causes, in the first horizontal position, the first optical axis L1 to be parallel to the perpendicular line of the first placement surface 24 in the horizontal state, and causes, in the first inclined position, the first optical axis L1 to be parallel to the perpendicular line of the second placement surface 25 in the inclined state. The second rotating mechanism 92 is provided in the second reading unit 7, and rotates the second reading unit 7 around the second rotation axis O2, so that the second reading unit 7 is positioned between the second horizontal position and the second inclined position. The second rotating mechanism 92 positions the second reading unit 7 in the second horizontal position when the placement table 2 is in the horizontal state, and positions the second reading unit 7 in the second inclined position when the placement table 2 is in the inclined state. The second rotating mechanism 92 causes, in the second horizontal position, the second optical axis L2 to be parallel to the perpendicular line of the second placement surface 25 in the horizontal state, and causes, in the second inclined position, the second optical axis L2 to be parallel to the perpendicular line of the first placement surface 24 in the inclined state. Each of the rotating mechanisms 91 and 92 is connected to the mechanism control unit 103.

The control device 10 controls the image reading apparatus 1A, and controls rotating operations for rotating, according to the switch-over between the horizontal state and inclined state of the placement table 2, the respective reading units 6 and 7 between the horizontal position and the inclined position. Further, the control device 10 controls operations by the respective image reading units 61 and 71 for imaging the bound medium P while controlling the moving operations of the respective carriers 62 and 72, the rotating operations of the respective mirrors 64 and 74, and the rotating operations of the respective illuminations 81 and 82. The control device 10 includes, as functions thereof, as illustrated in FIG. 3, the image reading control unit 101, the illumination control unit 102, the mechanism control unit 103, an apparatus control unit 104, the image processing unit 105, a storage unit 106, and a communication unit 107. A hardware configuration of the control device 10 is mainly formed of a central processing unit (CPU) that executes arithmetic processing, memories (RAM and ROM) storing therein a program and information, input and output interfaces, and the like, similarly to a known personal computer or scanner device, and thus detailed description thereof will be omitted.

The image reading control unit 101 controls the imaging operation of each of the image reading units 61 and 71. The image reading control unit 101 controls imaging start and end timing, exposure time, exposure timing, and the like of each of the image reading units 61 and 71. The image reading control unit 101 according to this embodiment performs the control, by synchronizing at least the imaging start and end timing, of the imaging operations of the respective image reading units 61 and 71.

The illumination control unit 102 controls flashing operations of the respective illuminations 81 and 82. The illumination control unit 102 controls turn-on and turn-off timing, amount of light, and the like of the respective illuminations 81 and 82. The illumination control unit 102 according to this embodiment performs the control, by synchronizing at least the turn-on and turn-off timing, of the flashing operations of the respective illuminations 81 and 82.

The mechanism control unit 103 controls the respective carrier moving mechanisms 63 and 73, the respective mirror rotating mechanisms 65 and 75, the respective illumination rotating mechanisms 83 and 84, and the respective rotating mechanisms 91 and 92. The mechanism control unit 103 causes the actuators of the respective mechanisms to operate, and controls the moving operations of the respective carriers 62 and 72, the rotating operations of the respective mirrors 64 and 74, the rotating operations of the respective illuminations 81 and 82, and the rotating operations of the respective reading units 6 and 7. The mechanism control unit 103 according to this embodiment performs the control by synchronizing the moving operations of the respective carriers 62 and 72 with each other, synchronizing the rotating operations of the respective mirrors 64 and 74 with each other, synchronizing the rotating operations of the respective illuminations 81 and 82 with each other, and synchronizing the rotating operations of the respective reading units 6 and 7 with each other. Further, the mechanism control unit 103 synchronizes the moving operation of the first carrier 62, the rotating operation of the first mirror 64, and the rotating operation of the illuminations 81 with one another, and synchronizes the moving operation of the second carrier 72, the rotating operation of the second mirror 74, and the rotating operation of the illuminations 82 with one another.

The apparatus control unit 104 outputs, based on a reading instruction of a user, instructions to the respective control units 101 to 103 and 105 and 107, and causes the image reading apparatus 1A to perform the respective operations. Further, the apparatus control unit 104 determines, with a sensor not illustrated, the state of the image reading apparatus 1A and notifies outside of a failure or the like in the image reading apparatus 1A. The image reading apparatus 1A according to this embodiment has a scan button provided therein, which is exposed externally, although illustration thereof is omitted. The scan button is connected to the control device 10, and by being pressed down, the scan button outputs a scan button ON signal to give a reading instruction to the apparatus control unit 104. The scan button is not particularly limited, as long as the scan button outputs the scan button ON signal by being manipulated by a user, and the scan button may be, for example, any of a mechanical push button, a capacitive touch button, an optical touch button, and the like. As long as a reading instruction is given to the apparatus control unit 104, a scan button ON signal may be output to the control device 10 from an external device 100 connected to the control device 10, instead of from the scan button.

The image processing unit 105 generates, based on a first imaging signal output from the first image reading unit 61, the first read data corresponding to a part of the bound medium P, and generates, based on a second imaging signal output from the second image reading unit 71, the second read data corresponding to a part of the bound medium P. Further, the image processing unit 105 generates the image data corresponding to the bound medium P by combining the generated first read data and second read data. Since the first read data and the second read data include the mutually overlapping data, based on an overlapping area of the first read data and second read data, image data are generated by one of the first read data and second read data being combined with read data of the other one of the first read data and second read data, the read data excluding the overlapping area. Furthermore, the image processing unit 105 performs correction and cropping of the first read data and second read data, or the image data.

The storage unit 106 stores therein the generated first read data, second read data, and image data.

The communication unit 107 connects the image reading apparatus 1A and the external device 100 to each other. The communication unit 107 performs the connection to the external device 100 wiredly via a USB or the like, or wirelessly via Wi-Fi or the like. The communication unit 107 is able to output the first read data, second read data, and image data stored in the storage unit 106 to the connected external device 100. The external device 100 is not particularly limited, and may be: a mobile terminal, such as a smartphone, a mobile phone, a tablet, or a notebook PC; a desktop PC; a server; or the like. By being connected to outside by the communication unit 107, the image reading apparatus 1A may function as a network scanner.

Next, the operation of the image reading apparatus 1A according to this embodiment will be described. The image reading apparatus 1A performs the reading operation for both of the spread pages P1 and P2 of the bound medium P placed in the opened state on the placement table 2. Firstly, a user turns power, which is not illustrated, of the image reading apparatus 1A on, and supplies electric power from outside to the image reading apparatus 1A. Next, the user switches over the state of the placement table 2 of the image reading apparatus 1A to the horizontal state or the inclined state, as illustrated in FIG. 1 or FIG. 2. When the power is turned on, each of the carriers 62 and 72, each of the mirrors 64 and 74, and each of the illuminations 81 and 82 is positioned in the reading start position. Further, the user does not need to perform the switch-over if the placement table 2 is in a desired state when the power is turned on.

Next, the apparatus control unit 104 determines, as illustrated in FIG. 7, whether or riot the placement table 2 is in the horizontal state (Step ST1). The apparatus control unit 104 determines, based on a detection signal from the placement table detecting sensor 27, which of the horizontal state and inclined state the placement table 2 is in.

Next, if the apparatus control, unit 104 determines that the placement table 2 is in the horizontal state (Step ST1; Yes), the apparatus control unit 104 causes each of the reading units 6 and 7 to rotate to the horizontal position (Step ST2). When the placement table 2 is switched over from the inclined state to the horizontal state, the apparatus control unit 104 causes the mechanism control unit 103 to control each of the rotating mechanisms 91 and 92 to rotate each of the reading units 6 and 7 from the inclined position to the horizontal position. If the placement table 2 is in the horizontal state in advance before the power is turned on, since each of the reading units 6 and 7 has already rotated to the horizontal position, there is no need to rotate each of the reading units 6 and 7 to the horizontal position.

Next, as illustrated in FIG. 10 and FIG. 11, in the horizontal state of the placement table 2, the user places the bound medium P on the placement table 2, such that the first spread page P1 is opposite to the first placement surface 24 and the second spread page P2 is opposite to the second placement surface 25.

Next, the apparatus control unit 104 determines, as illustrated in FIG. 7, whether or not there has been any reading instruction (Step ST4). The apparatus control unit 104 determines whether or not the scan button, which is not illustrated, has been pressed down and the scan button ON signal has been obtained.

Next, if the apparatus control unit 104 determines that there has been a reading instruction (Step ST4; Yes), the apparatus control, unit 104 starts reading the bound medium P (Step ST5). The apparatus control unit 104 causes the illumination control unit 102 to turn on each of the illuminations 81 and 82 in the reading start position, and causes the image reading control unit 101 to start reading the bound medium P with each of the image reading units 61 and 71. If the apparatus control unit 104 determines that there has been no reading instruction (Step ST4; No), the apparatus control unit 104 repeats Steps ST1 to ST4 until there is a reading instruction.

Next, the mechanism control unit 103 performs mirror rotation control, carrier movement control, and illumination rotation control (Step ST6). The mechanism control unit 103 controls the respective carrier moving mechanisms 63 and 73, the respective mirror rotating mechanisms 65 and 75, and the respective illumination rotating mechanisms 83 and 84 in synchronization with one another, to move and rotate each of the carriers 62 and 72, each of the mirrors 64 and 74, and each of the illuminations 81 and 82, which are in the reading start positions illustrated in FIG. 5 and FIG. 6, toward the reading end positions illustrated in FIG. 8 and FIG. 9. Upon this control, since the respective image reading units 61 and 71 are performing the imaging operation, the read regions S1F and S2F of the image reading units 61 and 71 change in a direction orthogonally intersecting the opening direction of the bound medium P, that is, from a deep side towards a shallow side in the depth direction. That the first image reading unit 61 consecutively reads the first spread page P1 of the hound medium P, in a sub-scanning direction, which is a direction from the deep side towards the shallow side in the depth direction. The second image reading unit 71 consecutively reads the second spread page P2 of the bound medium P in the sub-scanning direction. By the rotation of the respective mirrors 64 and 74 from the reading start position towards the reading end position, the optical path lengths between the respective mirrors 64 and 74 and the respective placement surfaces 24 and 25 become longer, but, by the respective carriers 62 and 72 also moving from the reading start position towards the reading end position, the optical path lengths between the respective image reading units 61 and 71 and the respective mirrors 64 and 74 become shorter. Therefore, since the changes in the optical path lengths between the respective image reading units 61 and 71 and the respective placement surfaces 24 and 25 are able to be reduced, and in this embodiment, the optical path lengths are able to be made the same (or substantially the same), even if the respective read regions S1F and S2F are changed in the depth direction with respect to the bound medium P by the respective mirrors 64 and 74, change in image quality arising from the optical path lengths, the change between the read data read at the reading start position and the read data read at the reading end position, is able to be reduced. Therefore, reduction in the image quality is able to be prevented.

Next, the mechanism control unit 103 determines, as illustrated in FIG. 7, whether or not the reading end position has been reached (Step ST7).

Next, if the mechanism control unit 103 determines that the reading end position has been reached (Step ST7; Yes), the image processing unit 105 performs image processing of the read data (Step ST8). Herein, when the reading of the bound medium P by the respective image reading units 61 and 71 ends, the image processing unit 105 generates the first read data and the second read data. As illustrated in FIG. 10, the first read data correspond to the read area S1FA, which is the area read by the first image reading unit 61 from the reading start position to the reading end position, and correspond to an image, which includes the first spread page P1 and is at the first placement surface 24 side in the horizontal state of the placement table 2. The second read data correspond to the read area S2FA, which is the area read by the second image reading unit 71 from the reading start position to the reading end position, and correspond to an image, which includes the second spread page P2 and is at the second placement surface 25 side in the horizontal state of the placement table 2. Based on an overlapping area S0FA between the read areas S1FA and S2FA, the image processing unit 105 combines the respective read data to generate the image data corresponding to the image including the bound medium P in the horizontal state of the placement table 2.

The image processing unit 105 according to this embodiment performs correction and cropping with respect to the generated image data to generate image data corresponding to the bound medium P in the horizontal state of the placement table 2.

Next, the mechanism control unit 103 causes, as illustrated in FIG. 7, the respective carriers 62 and 72, the respective, mirrors 64 and 74, and the respective illuminations 81 and 82 to move and rotate to a standby position, that is, the reading start position (Step ST9).

Next, the apparatus control unit 104 outputs the image data (Step ST10). The apparatus control unit 104 outputs the image data corresponding to both of the spread pages P1 and P2 of the bound medium P read in the horizontal state of the placement table 2, to the external device 100.

Further, if the apparatus control unit 104 determines that the placement table 2 is not in the horizontal state (Step ST1; No), the apparatus control unit 104 causes each of the reading units 6 and 7 to rotate to the inclined position (Step ST3). When the placement table 2 is switched over from the horizontal state to the inclined state, the apparatus control unit 104 causes the mechanism control unit 103 to control the respective rotating mechanisms 91 and 92 to rotate the respective reading units 6 and 7 from the horizontal position to the inclined position. If the placement table 2 is in the inclined state in advance before the power is turned on, since each of the reading units 6 and 7 has already rotated to the inclined position, there is no need to rotate each of the reading units 6 and 7 to the inclined position.

Next, as illustrated in FIG. 13 and FIG. 14, in the inclined state of the placement table 2, the user places the bound medium P on the placement table 2, such that the first spread page P1 is opposite to the first placement surface 24 and the second spread page P2 is opposite to the second placement surface 25.

Next, Step ST4 to Step ST8 are performed. As illustrated in FIG. 13, the generated first read data correspond to the read area S1VA, which is the area read by the first image reading unit 61 from the reading start position to the reading end position, and correspond to an image, which includes the second spread page P2 and is at the second placement surface 25 side in the inclined state of the placement table 2. The second read data correspond to the read area S2VA, which is the area read by the second image reading unit 71 from the reading start position to the reading end position, and correspond to an image, which includes the first spread page P1 and is at the first placement surface 24 side in the inclined state of the placement table 2. Based on an overlapping area SOYA between the read areas S1VA and S2VA, the image processing unit 105 combines the respective read data to generate the image data corresponding to the image including the bound medium P in the inclined state of the placement table 2. The image processing unit 105 according to this embodiment performs correction and cropping with respect to the generated image data to generate image data corresponding to the bound medium P in the inclined state of the placement table 2.

As described above, in the image reading apparatus 1A according to this embodiment, the first image reading unit 61 and the second image reading unit 71 read the bound medium P without their optical axes L1 and L2 intersecting each other in the horizontal state, and read the bound medium P with their optical axes L1 and L2 intersecting each other in the inclined state. Further, since the distances between the respective rotation axes O1 and O2 and the respective placement surfaces 24 and 25 are equal to each other between the horizontal state and the inclined state of the placement table 2, the change in the optical path length from each of the reading units 6 and 7 to the bound medium P, the change arising from whether the placement table 2 is in the horizontal state or inclined state, is able to be prevented. Thereby, since different area of the bound, medium P placed on the placement table 2 are read, and the read regions of the first reading unit 6 and second reading unit 7 with respect to the bound medium P are switched over between the horizontal state and inclined state of the placement table 2 under the same reading state conditions, for both of the horizontal state and inclined state of the placement table 2, the bound medium P is able to be read with the same image quality.

Further, since the respective spread pages P1 and P2 of the bound medium P are respectively read by the two image reading units, instead of both of the spread pages P1 and P2 of the bound medium P being read by a single image reading unit, the bound medium P is able to be read with high resolution. Furthermore, since the respective spread pages P1 and P2 of the bound medium P are simultaneously read, as compared to a case where both of the spread pages P1 and P2 are read by a single image reading unit, high speed ret is possible.

Further, since the respective mirrors 64 and 74 fold back the respective optical axes L1 and L2 in the depth direction, at the lower side the vertical direction, to the shallower side in the depth direction than the respective mirrors 64 and 74 as viewed in the width direction, the length of the image reading apparatus 1A in the depth direction is able to be shortened.

[b] Second Embodiment

Figure 15:
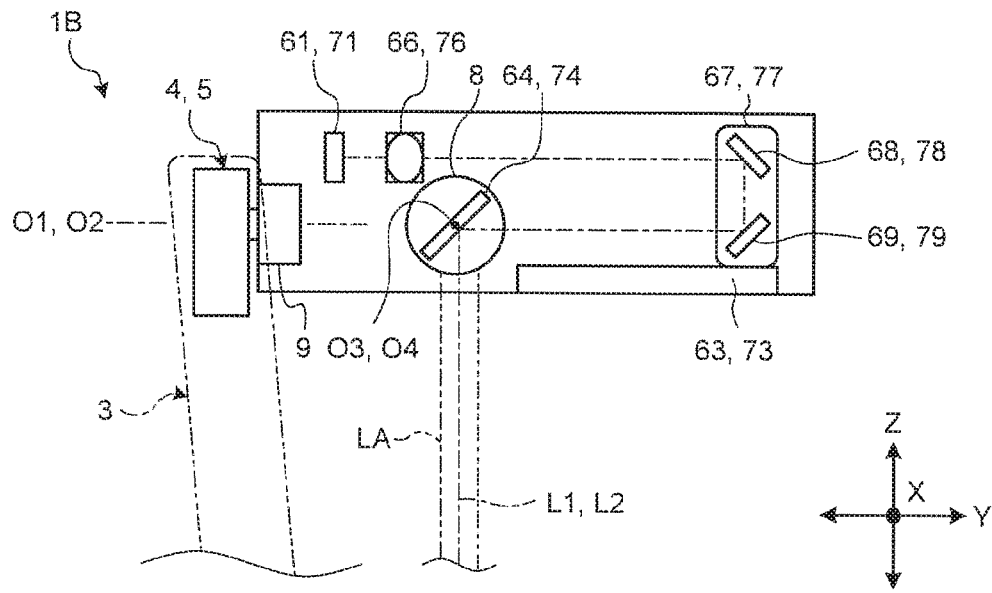
FIG. 15 is a diagram illustrating an image reading apparatus according to a second embodiment.
Figure 16:
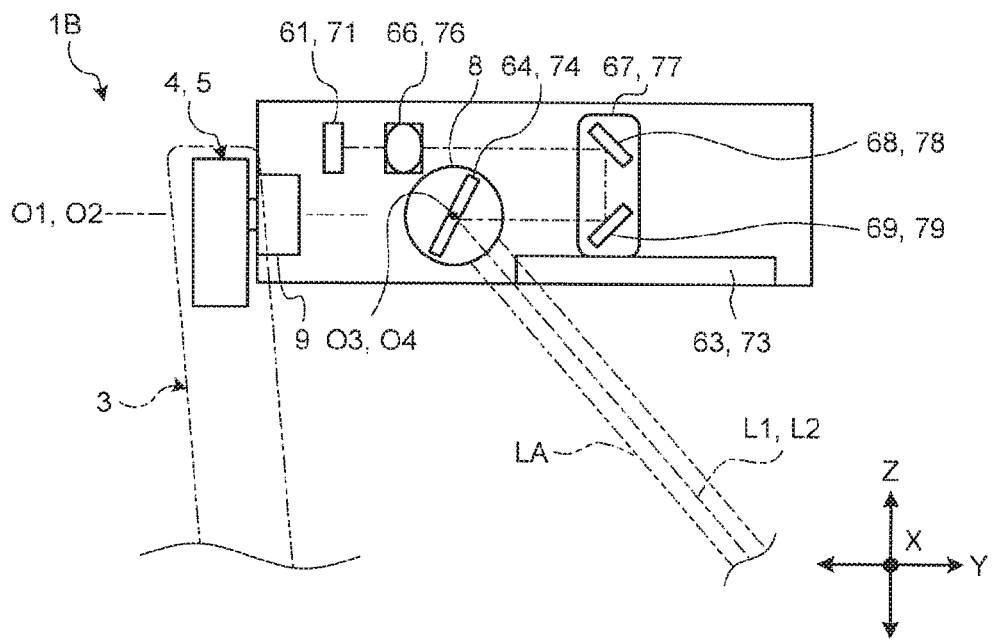
FIG. 16 is an explanatory diagram of an operation of the image reading apparatus according to the second embodiment.

Next, a second embodiment will be described. FIG. 15 is a diagram illustrating an image reading apparatus according to a second embodiment. FIG. 16 is an explanatory diagram of an operation of the image reading apparatus according to the second embodiment. As illustrated in FIG. 15 and FIG. 16, an image reading apparatus 1B according to the second embodiment has components accommodated in each of carriers 67 and 77, the components different from those in the image reading apparatus 1A according to the first embodiment.

The first carrier 67 accommodates therein two fold-back mirrors 68 and 69 for folding back the first optical axis L1 of the first image reading unit 61 in the depth direction inside the first reading unit 6. The first image reading unit 61 and the lens 66 are not accommodated in the carrier 67, and are fixed inside the first reading unit 6. The first image reading unit 61 and the lens 66 are arranged upper in the vertical direction than the first mirror 64. Further, the first image reading unit 61, the first mirror 64, and the lens 66 are arranged at a deeper side in the depth direction than the carrier 67.

The second carrier 77 has two fold-back mirrors 78 and 79 for folding back the second optical axis L2 of the second image reading unit 71 in the depth direction inside the second reading unit 7. The second image reading unit 71 and the lens 76 are not accommodated in the carrier 77, and are fixed inside the second reading unit 7. The second image reading unit 71 and the lens 76 are arranged upper in the vertical direction than the second mirror 74. Further, the second image reading unit 71, the second mirror 74, and the lens 76 are arranged at a deeper side in the depth direction than the carrier 77.

When the reading operations are performed by the respective reading units 6 and 7, the respective carriers 67 and 77 are moved by the respective carrier moving mechanisms 63 and 73 from the reading start position illustrated in FIG. 15 to the reading end position illustrated in FIG. 16, in synchronization with the rotating operations of the respective mirrors 64 and 74 and the respective illuminations 81 and 82. Thereby, the optical path lengths between the respective image reading units 61 and 71 and the respective mirrors 64 and 74 are shortened, and change in image quality arising from the optical path lengths, the change between the read data read at the reading start position and the read data read at the reading end position, is able to be reduced. Therefore, reduction in the image quality is able to be prevented.

As described above, in the image reading apparatus 1B according to this embodiment, by the fold-back in the depth direction in the respective reading units 6 and 7, the optical path lengths between the respective image reading units 61 and 71 and the respective mirrors 64 and 74 are able to be doubled correspondingly to the amount of movement in the depth direction of the carriers 67 and 77. Therefore, as compared to the first embodiment, increase in the lengths of the respective reading units 6 and 7 in the depth direction is able to be reduced, for changing the optical path lengths between the respective image reading units 61 and 71 and the respective mirrors 64 and 74 in consideration of the changes in the optical path lengths between the respective mirrors 64 and 74 and the respective placement surfaces 24 and 25.

[c] Third Embodiment

Figure 17:
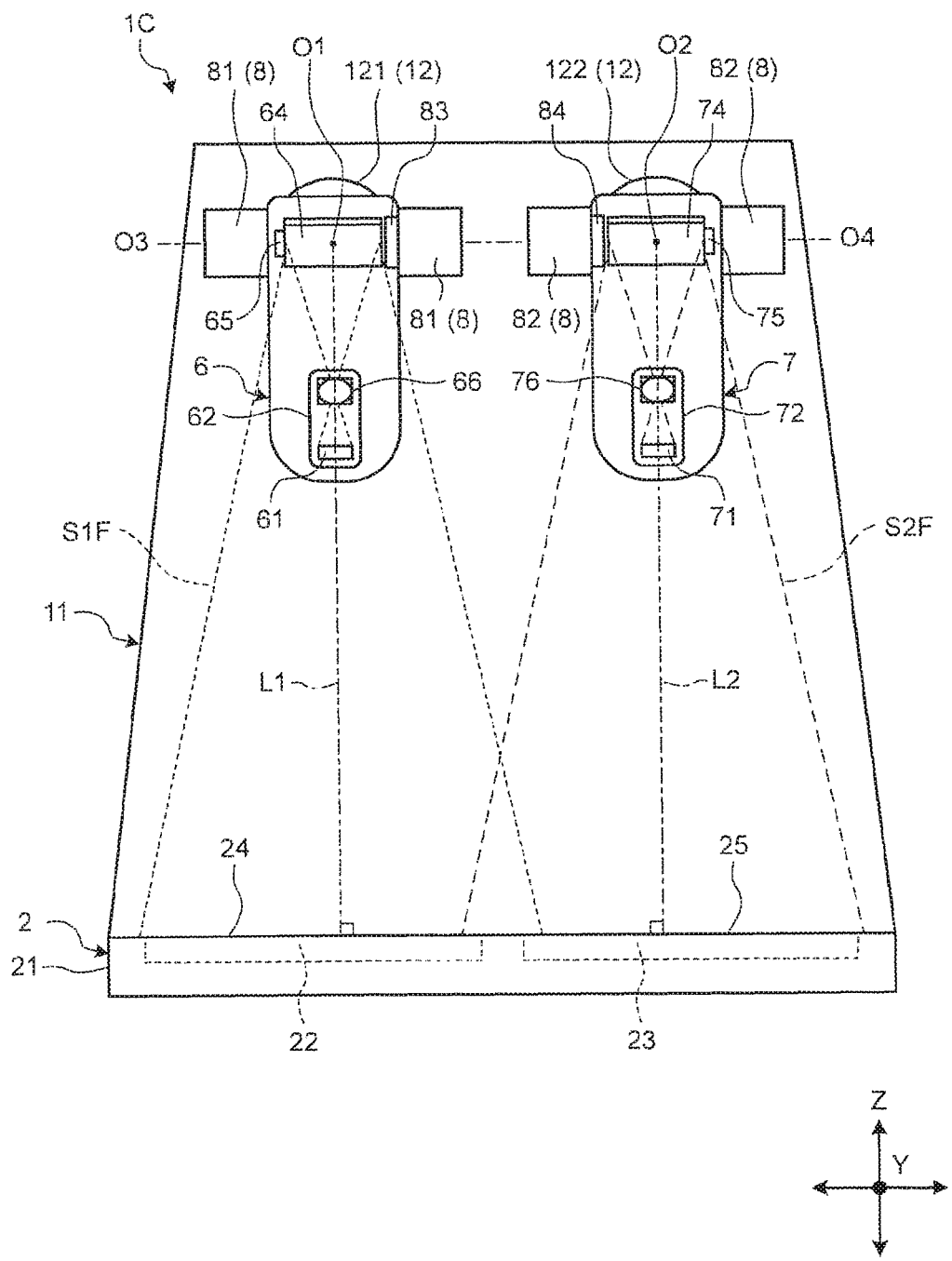
FIG. 17 is a front view of an image reading apparatus according to a third embodiment.
Figure 18:
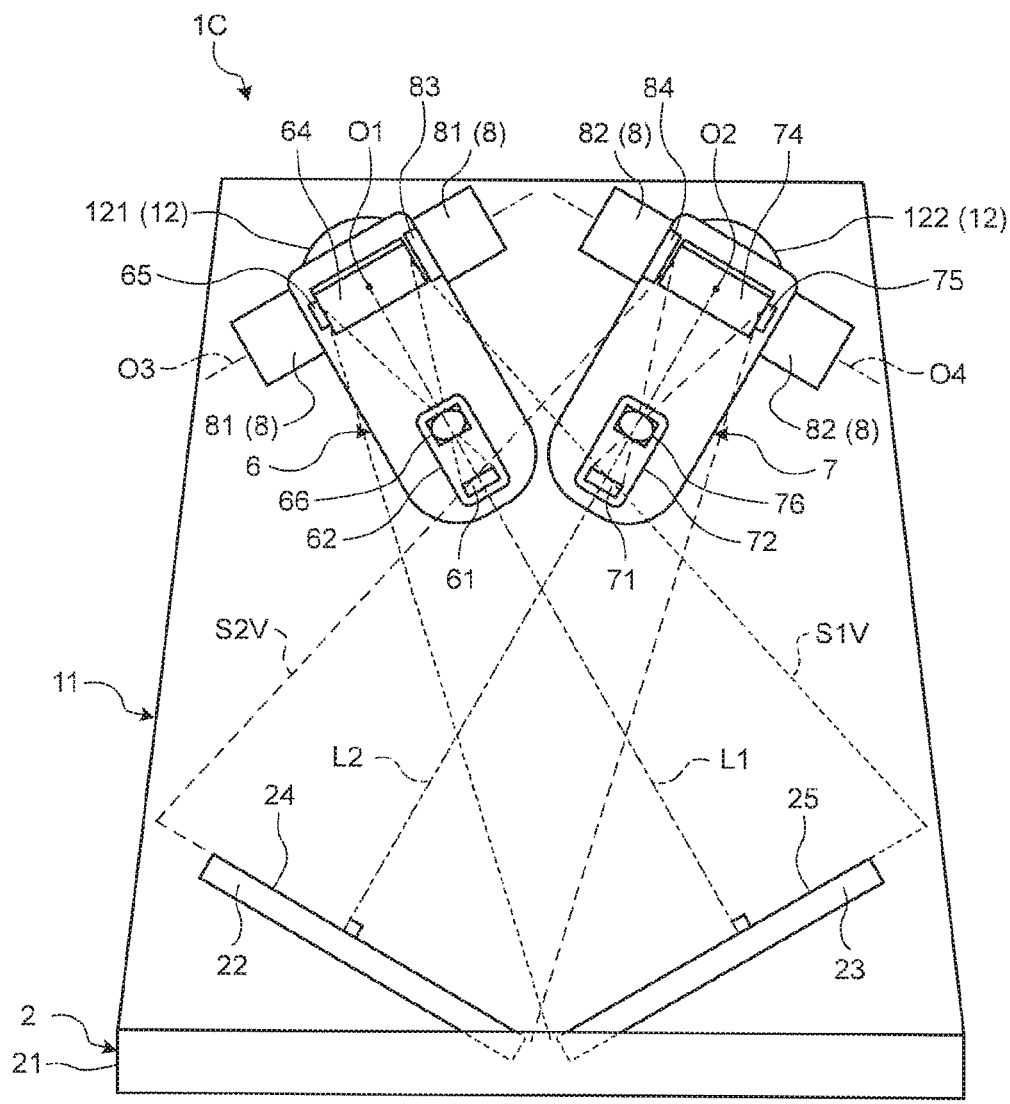
FIG. 18 is an explanatory diagram of an operation of the image reading apparatus according to the third embodiment.
Figure 18:
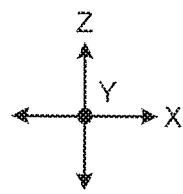

Next, a third embodiment will be described. FIG. 17 is front view of an image reading apparatus according to a third embodiment. FIG. 18 is an explanatory diagram of an operation of the image reading apparatus according to the third embodiment. As illustrated in FIG. 17 and FIG. 18, in contrast to the image reading apparatus 1A according to the first embodiment, in an image reading apparatus 1C according to the third embodiment, each of the reading units 6 and 7 is provided in the vertical direction, instead of in the depth direction.

A case 11 accommodates therein the respective reading units 6 and 7, the respective illuminations 81 and 82, and a rotating mechanism 12. The case 11 is formed to extend upward in the vertical direction from the placement table 2, and has an opening portion formed therein, which is not illustrated, so that when the case 11 is viewed from a lower side to an upper side in the vertical direction, the respective mirrors 64 and 74 and the respective illuminations 81 and 82 are exposed to the respective placement surfaces 24 and 25. The case 11 supports the first reading unit 6 freely rotatably around the first rotation axis O1. The case 11 supports the second reading unit 7 freely rotatably around the second rotation axis O2.

The rotating mechanism 12 rotates each of the two reading units 6 and 7. The rotating mechanism 12 according to this embodiment, includes a first rotating mechanism 121 and a second rotating mechanism 122. The first rotating mechanism 121 is provided in the case 11, and rotates the first reading unit 6 between a first horizontal position illustrated in FIG. 17 and a first inclined position illustrated in FIG. 18, around the first rotation axis O1. The first rotating mechanism 121 positions the first reading unit 6 in the first horizontal position when the placement table 2 is in a horizontal position, and positions the first reading unit 6 in the first inclined position when the placement table 2 is in an inclined position. The second rotating mechanism 122 is provided in the case 11, and rotates the second reading unit 7 between a second horizontal position illustrated in FIG. 17 and a second inclined position illustrated in FIG. 18, around the second rotation axis O2. The second rotating mechanism 122 positions the second reading unit 7 in the second horizontal position when the placement table 2 is in the horizontal position, and positions the second reading unit 7 in the second inclined position when the placement table 2 is in the inclined position. Each of the rotating mechanisms 121 and 122 is connected to the mechanism control unit 103, although illustration thereof is omitted.

The first mirror 61 is positioned upper in the vertical direction than the first image reading unit 61. The first mirror 64 according to this embodiment is arranged at a deeper side in the depth direction than the bound medium P (each of the placement surfaces 24 and 25) placed on the placement table 2 as viewed in the width direction. The first mirror 64 folds back, at the third rotation axis O3, the first optical axis L1 in the vertical direction to a shallower side in the depth direction than the first mirror 64, in the vertical direction and as viewed in the width direction. Further, the second mirror 74 is positioned upper in the vertical direction than the second image reading unit 71. The second mirror 74 according to this embodiment is arranged at a deeper side in the depth direction than the bound medium P (each of the placement surfaces 24 and 25) placed on the placement table 2 as viewed in the width direction. The second mirror 74 folds back, at the fourth rotation axis O4, the second optical axis L2 in the vertical direction to a shallower side in the depth direction than the second mirror 74, in the vertical direction and as viewed in the width direction.

When the placement table 2 is switched over from the horizontal state to the inclined state in the image reading apparatus 1C, as illustrated in FIG. 18, the respective reading units 6 and 7 rotate from the horizontal position co the inclined position around the respective rotation axes O1 and O2. Upon this rotation, each of the reading units 6 and 7 rotates inside the case 11.

As described above, since each of the reading units 6 and 7 does not extend in the depth direction, and extends downward in the vertical direction, installation space in the depth direction Lipper in the vertical direction is able to be omitted and thus the image reading apparatus 1C according to this embodiment is able to be downsized.

According to the above described first to third embodiments, the respective mirror rotating mechanisms 65 and 75 and illumination rotating mechanisms 83 and 84 are separately bodied, but the respective mirrors 64 and 74 and illuminations 81 and 82 may be respectively rotated by a single rotating mechanism in synchronization with one another. In this case, the single rotating mechanism is configured such that the respective illuminations 81 and 82 rotate with a rotation angle that is twice the rotation angle of the respective mirrors 64 and 74.

[d] Fourth Embodiment

Figure 19:
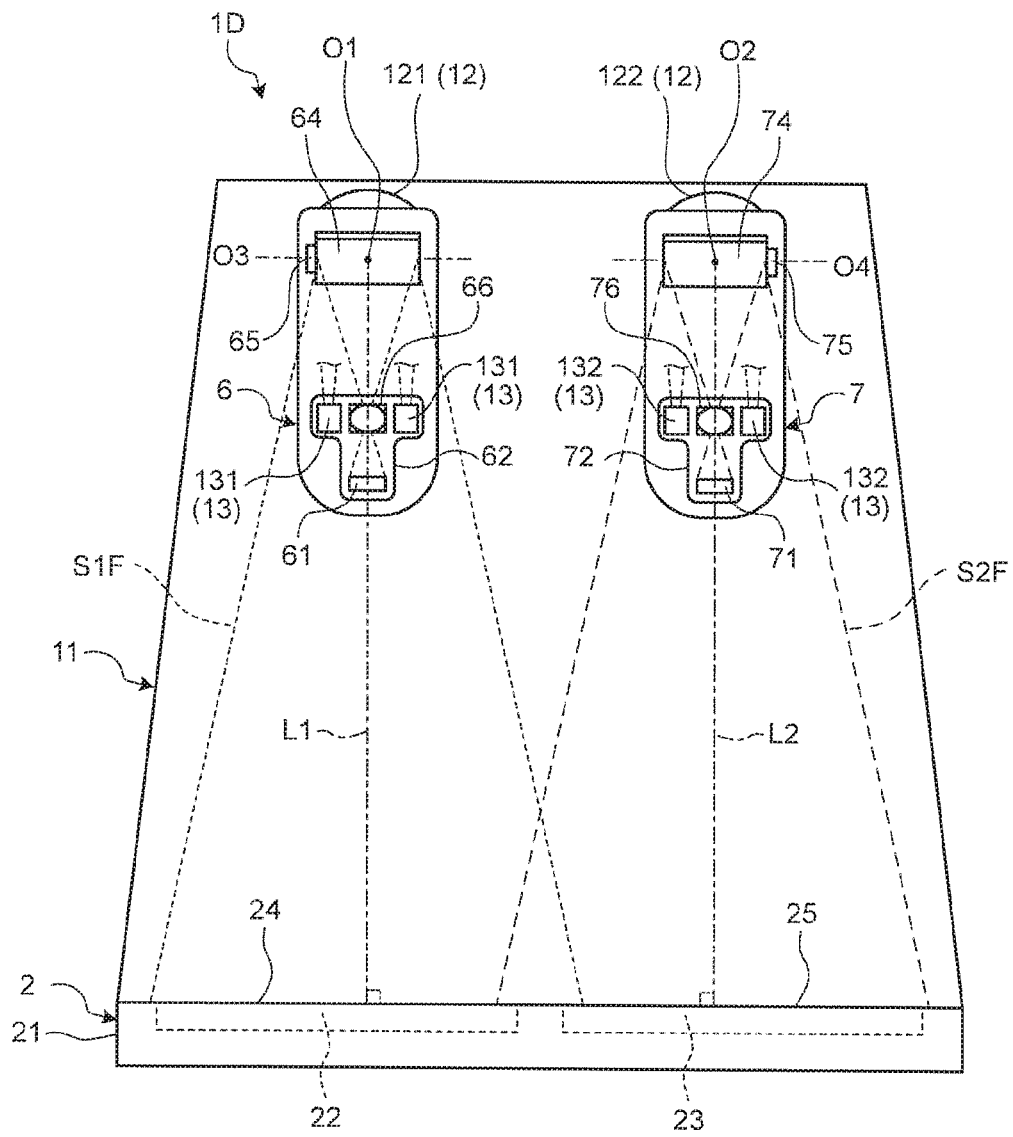
FIG. 19 is a front view of an image reading apparatus according to a fourth embodiment.
Figure 19:
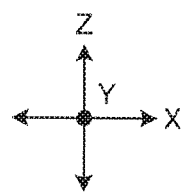
Figure 20:
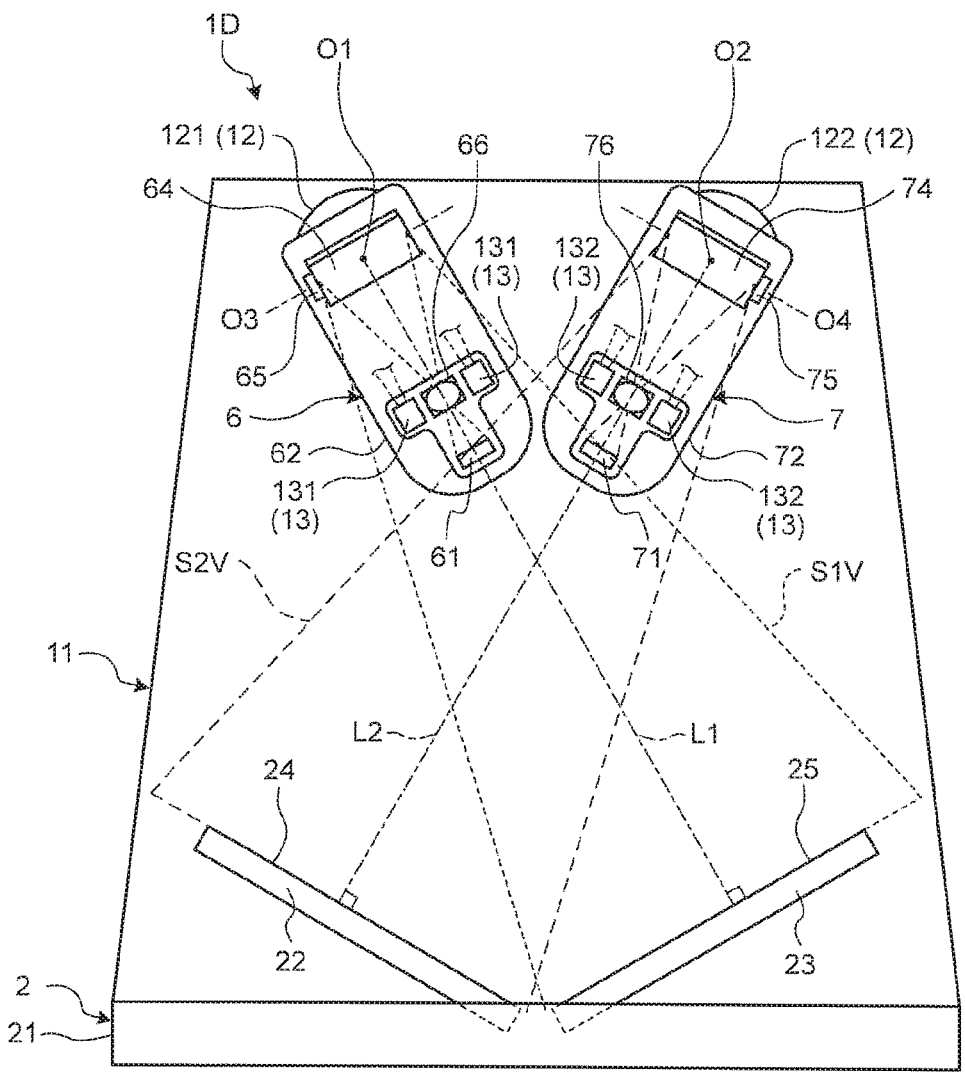
FIG. 20 is an explanatory diagram of an operation of the image reading apparatus according to the fourth embodiment.

Next, a fourth embodiment will, be described. FIG. 19 is a front view of an image reading apparatus according to a fourth embodiment. FIG. 20 is an explanatory diagram of an operation of the image reading apparatus according to the fourth embodiment. As illustrated in FIG. 19 and FIG. 20, in contrast to the image reading apparatus 1C according to the third embodiment, an illumination 13 is accommodated in the respective carriers 62 and 72 in an image reading apparatus 1D according to the fourth embodiment.

The illumination 13 irradiates the bound medium P with light, the bound medium P placed on the placement table 2. The illumination 13 according to this embodiment includes first illuminations 131 provided in the first carrier 62, and second illuminations 132 provided in the second carrier 72. The first illuminations 131 are provided at both width direction end portions of the lens 66 as viewed in the depth direction, and irradiate the bound medium P with light, via the first mirror 64. An irradiation range of the first illuminations 131 has a belt shape extending in the width direction, and is set more largely than the read region S1F or S1V in the width direction. The second illuminations 132 are provided at both width direction end portions of the lens 76 as viewed in the depth direction, and irradiate the bound medium P with light, via the second mirror 74. An irradiation range of the second illuminations 132 has a belt shape extending in the width direction, and is set more largely than the read region S2F or S2V in the width direction. That is, in the image reading apparatus 1D, without the respective illumination rotating mechanisms 83 and 84, the respective illuminations 131 and 132 are fixed in the respective carriers 62 and 72, and by movement of the respective carriers 62 and 72, the distances of the respective illuminations 131 and 132 from the respective mirrors 64 and 74 are changed, together with the respective image reading units 61 and 71 and the respective lenses 66 and 76. The respective illuminations 131 and 132 are provided with respect to the respective image reading units 61 and 71 and the respective lenses 66 and 76, such that the respective optical axes L1 and L2 (the read regions S1F, S1V, S2F, and S2V) are included in the irradiation ranges. That is, a position on the bound medium P, the position irradiated by the illumination 13, is changed in synchronization with a positional change of the first optical axis L1 and the second optical axis L2 with respect to the bound medium P.

As described above, the image reading apparatus 1D according to this embodiment is able to be configured simply, because reading of the bound medium P is able to be performed by the respective image reading units 61 and 71 without rotation of the respective illuminations 131 and 132 in synchronization with the rotation of the respective mirrors 64 and 74.

[e] Fifth Embodiment

Figure 21:
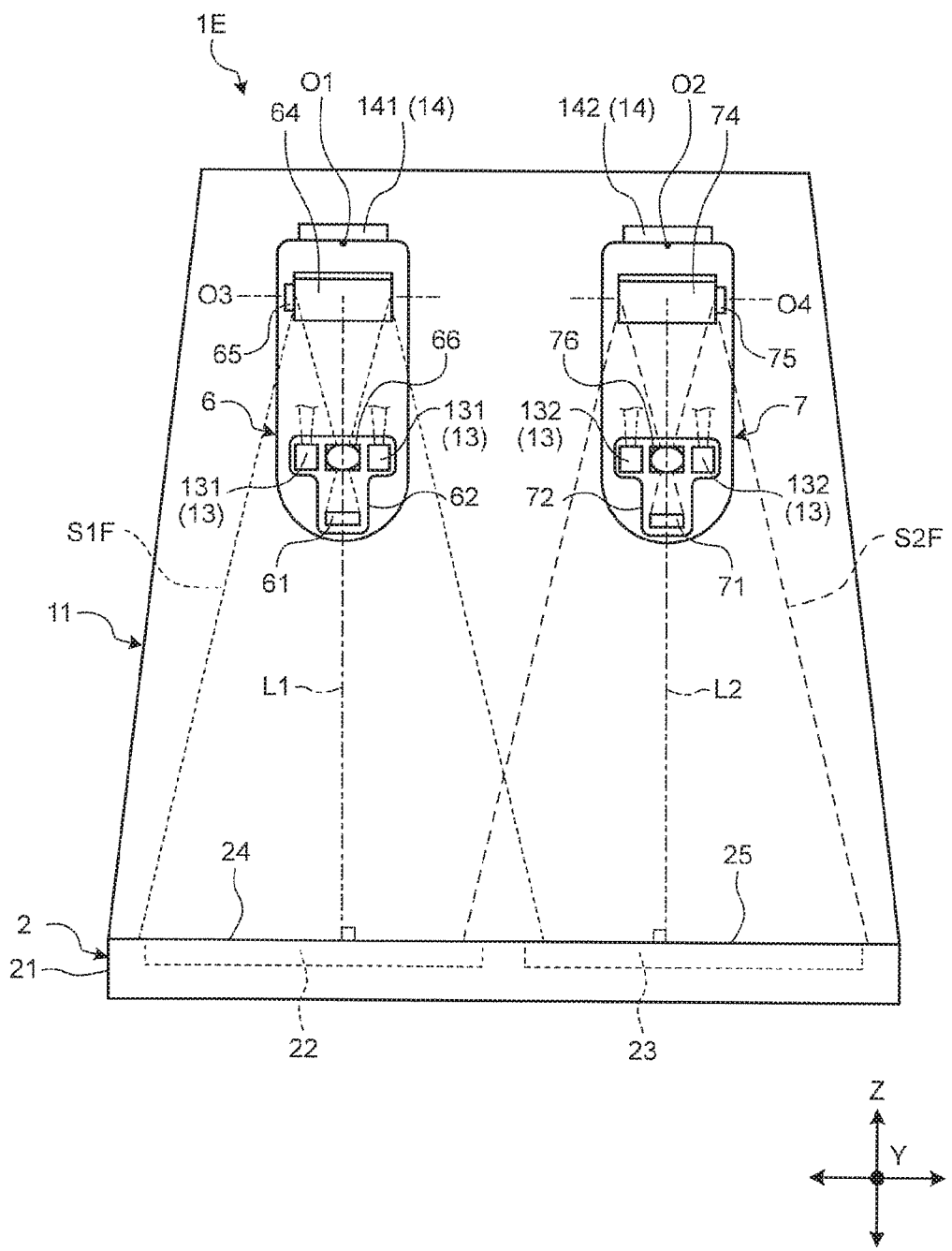
FIG. 21 is a front, view of an image reading apparatus according to a fifth embodiment.
Figure 22:
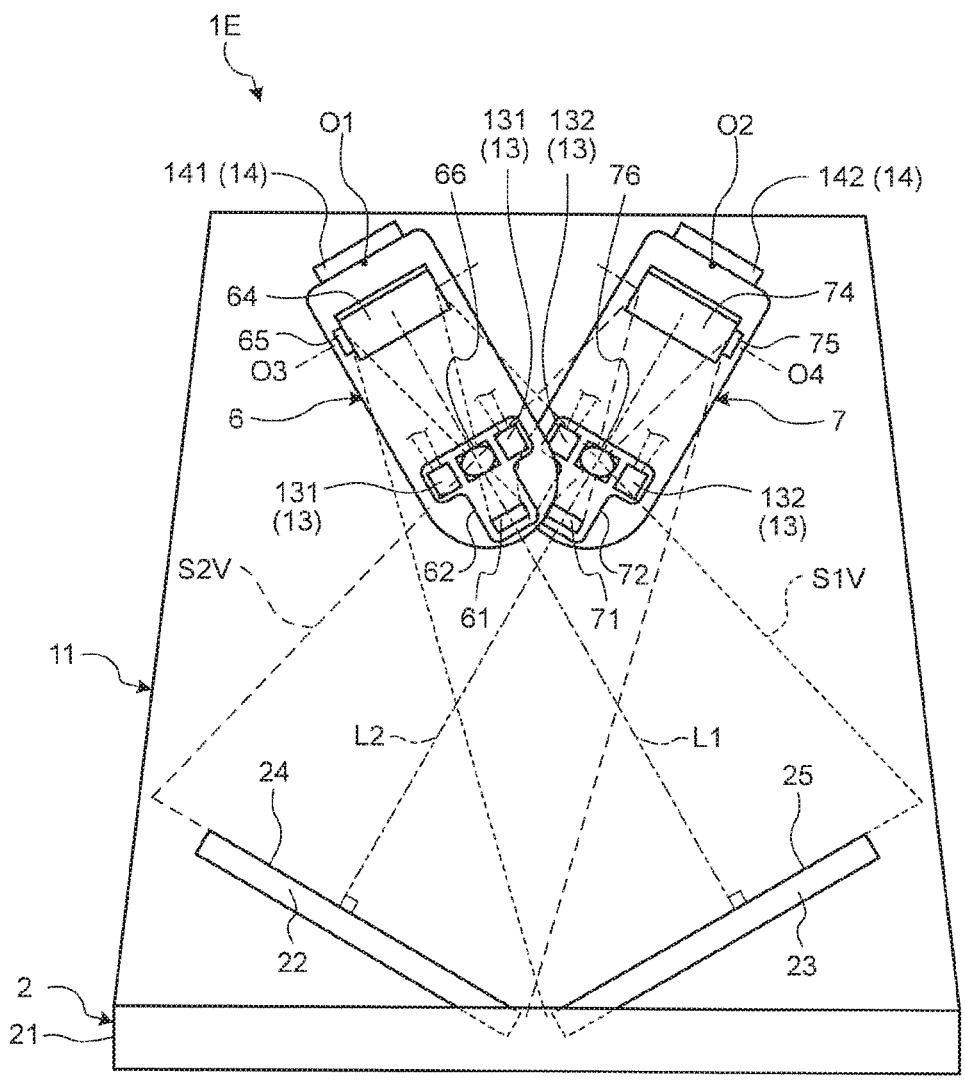
FIG. 22 is an explanatory diagram of an operation of the image reading apparatus according to the fifth embodiment.

Next, a fifth embodiment will be described. FIG. 21 is a front view of an image reading apparatus according to a fifth embodiment. FIG. 22 is an explanatory diagram of an operation of the image reading apparatus according to the fifth embodiment. As illustrated in FIG. 21 and FIG. 22, in contrast to the image reading apparatus 1D according to the fourth embodiment, the respective rotation axes O1 and O2 and the respective rotation axes O3 and O4 are arranged at different positions in an image reading apparatus 1E according to the fifth embodiment.

The first reading unit 6 is supported with respect to the case 11 such that the third rotation axis O3, which is the rotation axis of the first mirror 64, is positioned lower in the vertical direction than the first rotation axis O1 as viewed in the depth direction. The second reading unit 7 is supported with respect to the case 11 such that the fourth rotation axis O4, which is the rotation axis of the second mirror 74, is positioned lower in the vertical direction than the second rotation axis O2 as viewed in the depth direction. A distance between the first rotation axis O1 and the third rotation axis O3 and a distance between the second rotation axis O2 and the fourth rotation axis O4 are the same.

A rotating mechanism 14 rotates each of the two reading units 6 and 7. The rotating mechanism 14 according to this embodiment includes a first rotating mechanism 141 and a second rotating mechanism 142. The first rotating mechanism 141 is provided between the case 11 and the first reading unit 6, and rotates the first reading unit 6, around the first rotation axis O1, between a first horizontal position illustrated in FIG. 21 and a first inclined position illustrated in FIG. 22. That is, the first rotating mechanism 141 rotates the first mirror 64 around the first rotation axis O1. The first rotating mechanism 141 positions the first reading unit 6 in the first horizontal position when the placement table 2 is in the horizontal position, and positions the first reading unit 6 in the first inclined position when the placement table 2 is in the inclined position. The second rotating mechanism 142 is provided between the case 11 and the second reading unit 7, and rotates the second reading unit 7, around the second rotation axis O2, between a second horizontal position illustrated in FIG. 21 and a second inclined position illustrated in FIG. 22. That is, the second rotating mechanism 142 rotates the second mirror 74 around the second rotation axis O2. The second rotating mechanism 142 positions the second reading unit 7 in the second horizontal position when the placement table 2 is in the horizontal position, and positions the second reading unit 7 in the second inclined position when the placement table 2 is in the inclined position. Each of the rotating mechanisms 141 and 142 is connected to the mechanism control unit 103, although illustration is omitted.

As described above, in the image reading apparatus 1E according to this embodiment, since the respective mirrors 64 and 74 are arranged lower in the vertical direction than the respective rotation axes O1 and O2, which are the rotation axes of the respective reading units 6 and 7, portions of the reading units 6 and 7 are able to be made smaller, the portions upper in the vertical direction than the respective rotation axes O1 and O2. Therefore, the installation space in the vertical direction is able to be decreased, and thus downsizing is able to be achieved.

In the above described third to fifth embodiments, if the respective reading units 6 and 7, which are provided in the vertical direction, overlap each other as viewed in the depth direction when the placement table 2 is in the inclined state, the respective reading units 6 and 7 are preferably provided in the case 11, such that the respective reading units 6 and 7 do not overlap each other as viewed in the width direction.

[f] Sixth Embodiment

Figure 23:
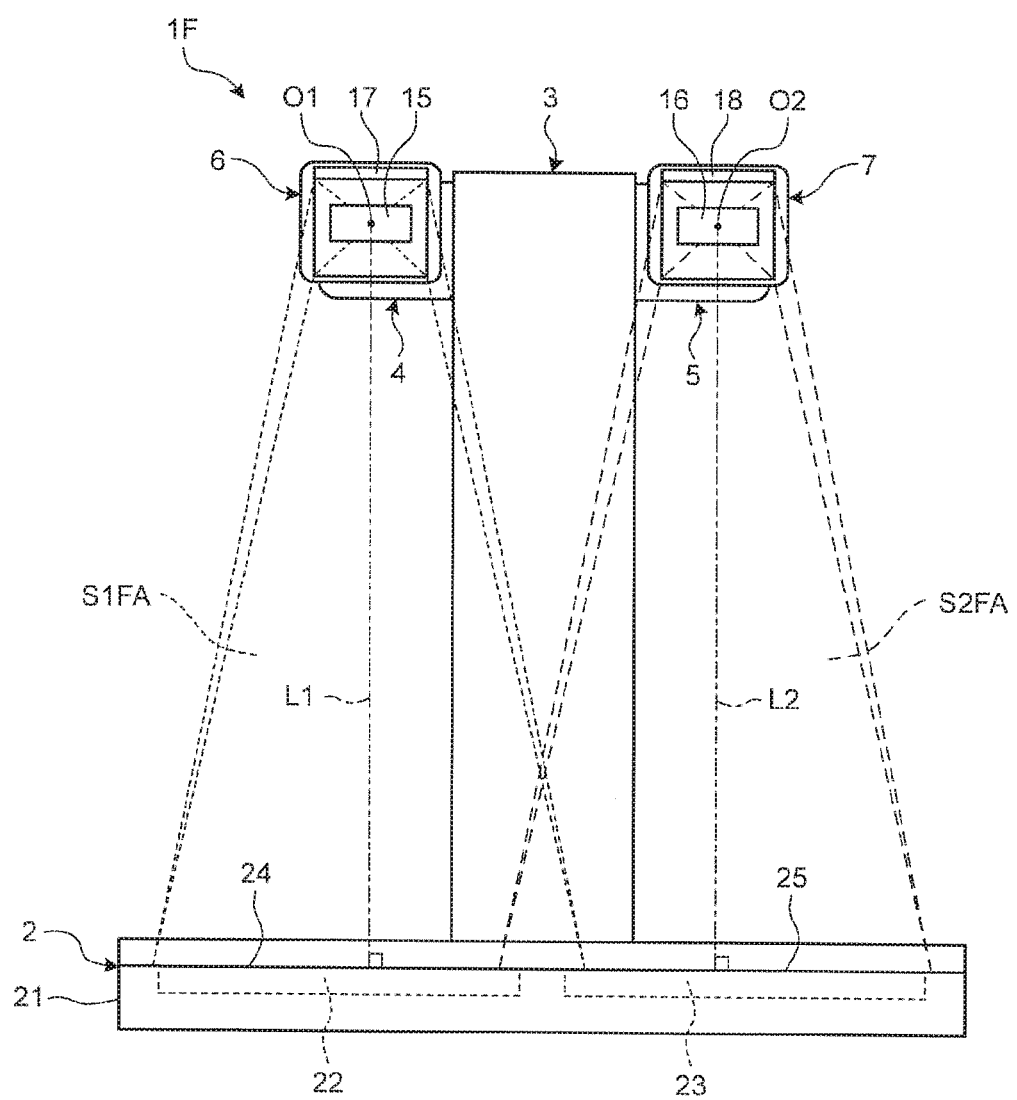
FIG. 23 is a front view of an image reading apparatus according to a sixth embodiment.
Figure 24:
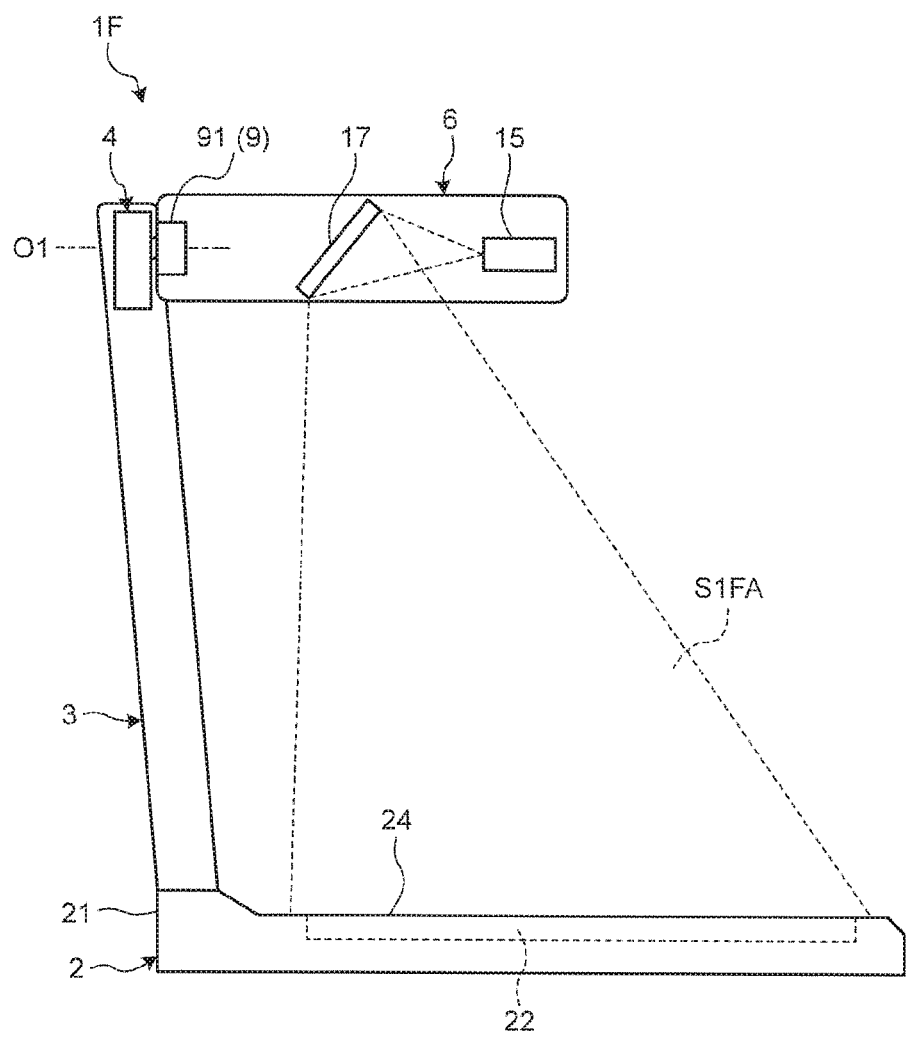
FIG. 24 is a side view of the image reading apparatus according to the sixth embodiment.
Figure 24:
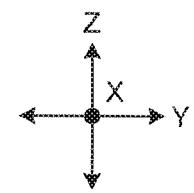
Figure 25:
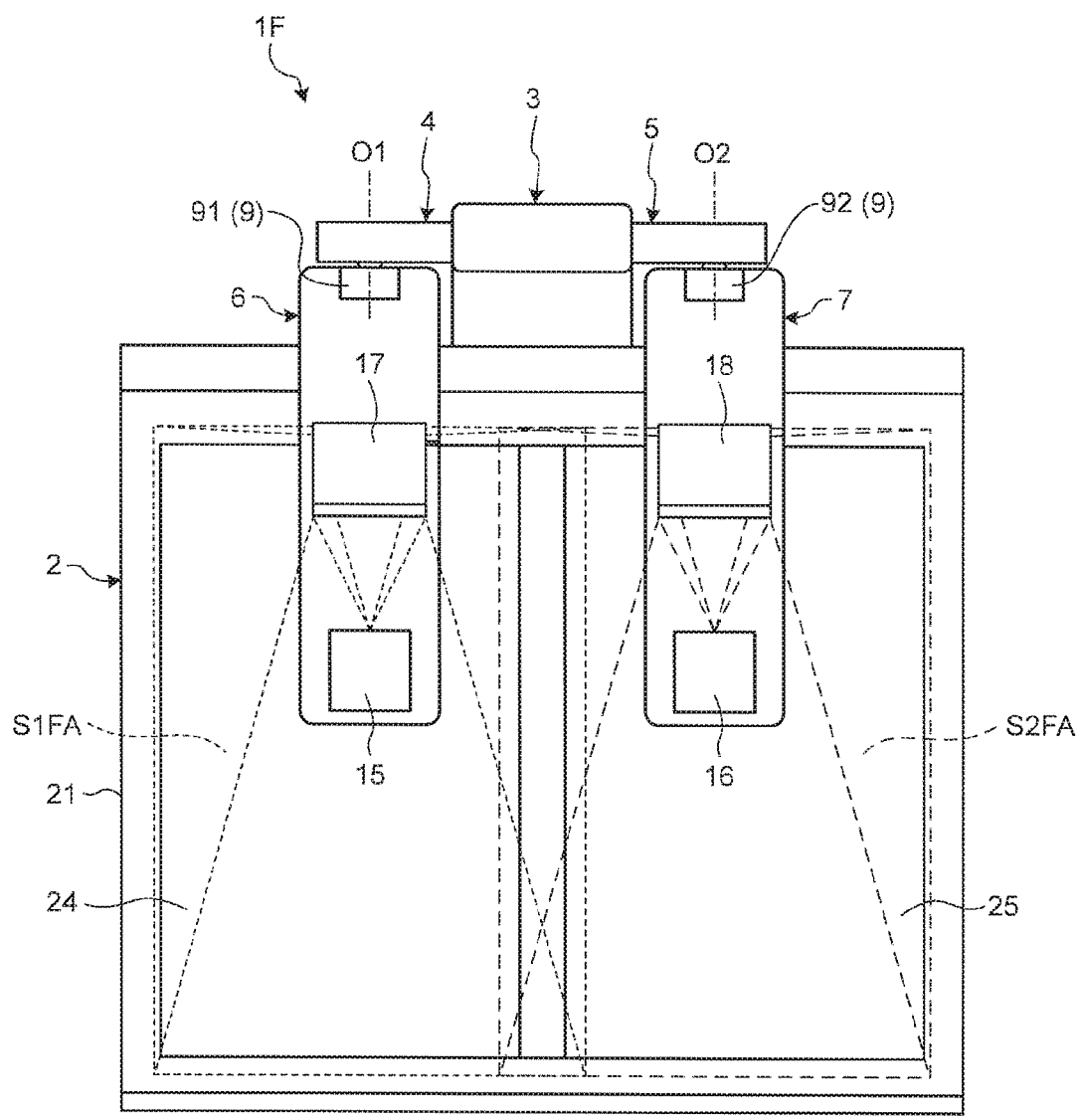
FIG. 25 is a plan view of the image reading apparatus according to the sixth embodiment.
Figure 25:
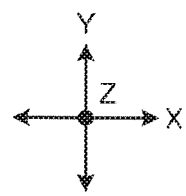
Figure 26:
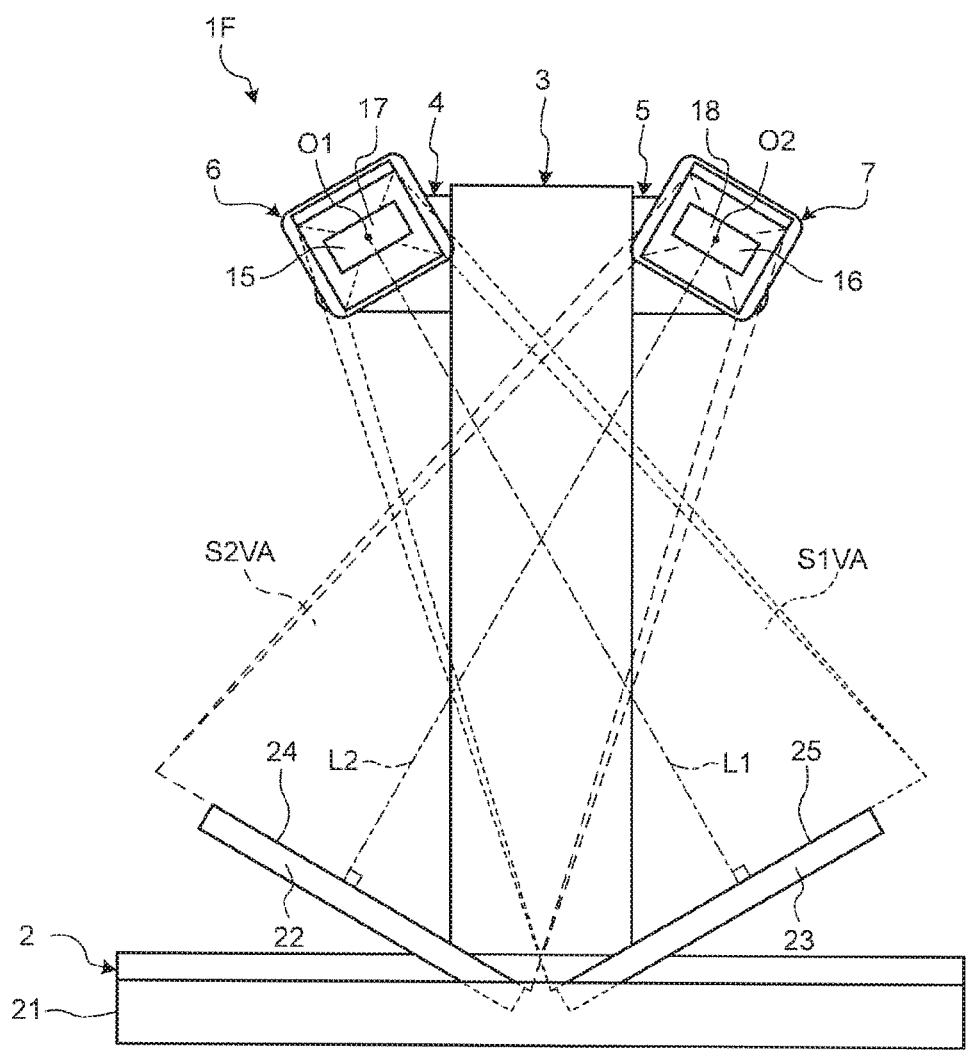
FIG. 26 is an explanatory diagram of an operation of the image reading apparatus according to the sixth embodiment.
Figure 26:
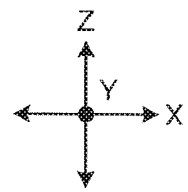

Next, a sixth embodiment will be described. FIG. 23 is a front view of an image reading apparatus for bound media according to the sixth embodiment. FIG. 24 is a side view of the image reading apparatus according to the sixth embodiment. FIG. 25 is a plan view of the image reading apparatus according to the sixth embodiment. FIG. 26 is an explanatory diagram of an operation of the image reading apparatus according to the sixth embodiment. As illustrated in FIG. 23, an image reading apparatus 1F according to the sixth embodiment has image reading units 15 and 16 which are differently configured respectively from those of the image reading apparatuses 1A to 1E according to the first to fifth embodiments.

As illustrated in FIG. 23 to FIG. 25, the first image reading unit 15 is provided fixed in the first reading unit 6 and reads an area of a part of the bound medium P placed on the placement table 2, and is, for example, a linear CCD sensor formed of plural imaging elements, which are arranged in the width direction and vertical direction in plural rows as viewed in the depth direction in a first horizontal position, and which are not illustrated. The first image reading unit 15 is connected to the image reading control unit 101 and the image processing unit 105, although illustration thereof is omitted. In a case where the first optical axis L1 of the first image reading unit 15 (the optical axis directed to the placement table 2) is viewed in a direction orthogonally intersecting the opening direction of the bound medium P, that is, in the depth direction, as illustrated in FIG. 23, the first optical axis L1 is parallel to a perpendicular line of the first placement surface 94 in the horizontal state when the first reading unit 6 is in the first horizontal position. Further, in a case where the first optical axis L1 of the first image reading unit 15 (the optical axis directed to the placement table 2) is viewed in the depth direction, as illustrated in FIG. 26, the first optical axis L1 is parallel to a perpendicular line of the second placement surface 25 in the inclined state when the first reading unit 6 is in the first inclined position. Further, the read area S1FA of the first image reading unit 15 in the first horizontal position and the horizontal state includes, as illustrated in FIG. 25, the first placement surface 24. That is, the read area S1FA of the first image reading unit 15 in the first horizontal position and the horizontal state includes the first spread page P1 of the bound medium P. On the contrary, the read area S1VA of the first image reading unit 15 in the first inclined position and the inclined state includes the second placement surface 25. That is, the read area S1VA of the first image reading unit 15 in the first inclined position and the inclined state includes the second spread page P2 of the bound medium P.

As illustrated in FIG. 23 to FIG. 25, the second image reading unit 16 is provided fixed in the second reading unit 7 and reads an area of a part of the bound medium P placed on the placement table 2, and is, for example, a linear COD sensor formed of plural, imaging elements, which are arranged in the width direction and vertical direction in plural rows as viewed in the depth direction in a second horizontal position, and which are not illustrated. The second image reading unit 16 is connected to the image reading control unit 101 and the image processing unit 105, although illustration thereof is omitted. In a case where the second optical axis L2 of the second image reading unit 16 (the optical axis directed to the placement table 2) is viewed in a direction orthogonally intersecting the opening direction of the bound medium P, that is, in the depth direction, as illustrated in FIG. 23, the second optical axis L2 is parallel to a perpendicular line of the second placement surface 25 in the horizontal state when the second reading unit 7 is in the second horizontal position. Further, in a case where the second optical axis L2 of the second image reading unit 16 (the optical axis directed to the placement table 2) is viewed in the depth direction, as illustrated in FIG. 26, the second optical axis L2 is parallel to a perpendicular line of the first placement surface 24 in the inclined state when the second reading unit 7 is in the second inclined position. Further, the read area S2FA of the second image reading unit 16 in the second horizontal position and the horizontal state includes, as illustrated. in FIG. 25, the second placement surface 25. That is, the read area S2FA of the second image reading unit 16 in the second horizontal position and the horizontal state includes the second spread page P2 of the bound medium P. On the contrary, the read area S2VA of the second image reading unit 16 in the second inclined position and the inclined state includes the first placement surface 24. That is, the read area S2VA of the second image reading unit 16 in the second inclined position and the inclined state includes the first spread page P1 of the bound medium P.

The read area S1FA or S1VA of the first image reading unit 15 includes a part of the read area S2FA or S2VA of the second image reading unit 16. The read area S1FA of the first image reading unit 15 is, as illustrated in FIG. 23, larger than the first placement surface 24 in the opening direction of the bound medium P. A width direction end portion of the read area S1FA, the width direction end portion at the second placement surface 25 side, is positioned at the second placement surface 25 side than the middle of the first placement unit 22 and the second placement unit 23 in the width direction. The read area S1VA of the first image reading unit 15 is, as illustrated in FIG. 26, larger than the second placement surface 25 in the opening direction of the bound medium P. A width direction end portion of the read area S1VA, the width direction end portion at the first placement surface 24 side, is positioned at the first placement surface 24 side than the middle of the first placement unit 22 and the second placement unit 23 in the width direction. Further, the read area S2FA of the second image reading unit 16 is, as illustrated in FIG. 23, larger than the second placement surface 25 in the opening direction of the bound medium P. A width direction end portion of the read area S2FA, the width direction end portion at the first placement surface 24 side, is positioned at the first placement surface 24 side than the middle of the first placement unit 22 and the second placement unit 23 in the width direction. The read area S2VA of the second image reading unit 16 is, as illustrated in FIG. 26, larger than the first placement surface 24 in the opening direction of the bound medium P. A width direction end portion of the read area S2VA, the width direction end portion at the second placement surface 25 side, is positioned at the second placement surface 25 side than the middle of the first placement unit 22 and the second placement unit 23 in the width direction. Therefore, since the read area S1FA or S1VA of the first image reading unit 15 and the read area S2FA or S2VA of the second image reading unit 16 partially overlap each other, the first read data read and generated by the first image reading unit 15 and the second read data read and generated by the second image reading unit 16 include mutually overlapping read data.

As illustrated in FIG. 23 to FIG. 25, a first mirror 17 changes the direction of the first optical axis L1 of the first image reading unit 15, and is provided fixed in the first reading unit 6. The first mirror positioned at a deeper side in the depth direction than the first image reading unit 15. The first mirror 17 folds back the first optical axis L1 in the depth direction downwards in the vertical direction.

A second mirror 18 changes the direction of the second optical axis L2 of the second image reading unit 16, and is provided fixed in the second reading unit 7. The second mirror 18 is positioned at a deeper side in the depth direction than the second image reading unit 16. The second mirror 18 folds back the second optical axis L2 in the depth direction downwards in the vertical direction.

Next, the operation of the image reading apparatus 1F according to this embodiment will be described. The image reading apparatus 1F performs the reading operation of both of the spread pages P1 and P2 of the bound medium P placed in the opened state on the placement table 2. Firstly, a user turns power, which is not illustrated, of the image reading apparatus 1F on, and supplies electric power from outside to the image reading apparatus 1F. Next, the user switches over the state of the placement table 2 of the image reading apparatus 1F to the horizontal state or the inclined state. Further, the user does not need to perform the switch-over if the placement table 2 is in a desired state when the power is turned on.

Next, if the apparatus control unit 104 determines that the placement table 2 is in the horizontal state, the apparatus control unit 104 causes each of the reading units 6 and 7 to rotate to the horizontal position. Next, the user places the bound medium P on the placement table 2 in the horizontal state of the placement table 2.

Next, when it is determined that there has been a reading instruction, the apparatus control unit 104 executes reading of the bound medium P. Specifically, the apparatus control unit 104 causes the image reading control unit 101 to cause the respective image reading units 15 and 16 to read the bound medium P to generate the first read data and second read data. Based on the overlapping area S0FA between the read areas S1FA and S2FA, the image processing unit 105 combines the respective read data to generate image data corresponding to an image including the bound medium P in the horizontal state of the placement table 2. The image processing unit 105 according to this embodiment performs correction and cropping with respect to the generated image data to generate image data corresponding to the bound medium P in the horizontal state of the placement table 2. Next, the apparatus control unit 104 outputs the image data.

Further, if the apparatus control unit 104 determines that the placement table 2 is not in the horizontal state, the apparatus control unit 104 causes each of the reading units 6 and 7 to rotate to the inclined position. Next, the user places the bound medium P on the placement table 2 in the inclined state of the placement table 2.

Next, when it is determined that there has been a reading instruction, the apparatus control unit 104 executes reading of the bound medium P. Specifically, the apparatus control unit 104 causes the image reading control unit 101 to cause the respective image reading units 15 and 16 to read the bound medium P to generate the first read data and second read data. Based on the overlapping area S0VA between the read areas S1VA and S2VA, the image processing unit 105 combines the respective read data to generate image data corresponding to an image including the bound medium P in the inclined state of the placement table 2. The image processing unit 105 according to this embodiment executes correction and cropping with respect to the generated image data to generate image data corresponding to the bound medium P in the inclined state of the placement table 2. Next, the apparatus control unit 104 outputs the image data.

As described above, in the image reading apparatus 1F according to this embodiment, when the respective image reading units 15 and 16 read the bound medium P, the read regions S1F, S1V, S2F, and S2V do not need to be moved in the sub-scanning direction, and thus the respective carriers 62 and 72, the respective carrier moving mechanisms 63 and 73, and the respective mirror rotating mechanisms 65 and 75 are not required. Therefore, a simple configuration is able to be achieved.

The respective image reading units 15 and 16 according to the sixth embodiment may be removable by a user. In this case, a mobile terminal having a camera owned by the user may be used as each of the image reading units 15 and 16.

Further, the inclined state of the placement table 2 according to the first to sixth embodiments may be in plural stages, not being limited to the single stage. In this case, according to the number of stages of the inclined state of the placement table 2, the inclined positions of the respective reading units 6 and 7 are set. Therefore, correspondingly to the number of stages of the inclined state of the placement table 2 detected by the placement table detecting sensor 27, the respective reading units 6 and 7 are rotated by the rotating mechanism 9, 12, or 14.

Further, the switch-over mechanism 26 according to the first to sixth embodiments may have an actuator, which is not illustrated. The switch-over mechanism 26 may switch over between the horizontal state and the inclined state of the placement table 2 with driving force from the actuator. That is, the switch-over of the states of the placement table 2 may be performed automatically. Further, the rotating mechanisms 9, 12, and 14 according to the first to sixth embodiments rotate the respective reading units 6 and 7 with the driving force from the actuators, but a user may manually rotate the respective reading units 6 and 7.

An image reading apparatus according to the present disclosure achieves an effect of being able to read a medium with the same image quality for both of when a placement table is in a horizontal state and when the placement table is in an inclined state, since a first reading unit and a second reading unit read different areas of the medium placed on the placement table, and the read areas of the medium are switched over under the same reading state conditions between the horizontal state and the inclined state of the placement table.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:
1. An image reading apparatus, comprising:
a placement table, on which a medium is placed;
a first reading unit having a first image reading unit that reads an area of a part of the medium placed on the placement table;
a second reading unit having a second image reading unit that reads an area of a part of the medium, the area being different from that read by the first image reading unit;
a rotating mechanism that rotates the first reading unit and the second reading unit;
a first placement surface and a second placement surface that are provided adjacent to each other in an opening direction of the medium; and
a switch-over mechanism that switches over the first placement surface and the second placement surface between: a horizontal state where the first placement surface and the second placement surface are on a same horizontal plane; and an inclined state where opposite end portions of the first placement surface and second placement surface are closer to the first reading unit and the second reading unit than close end portions of the first placement surface and second placement surface, the close end portions close to each other in the opening direction of the medium, the opposite end portions opposite to the close end portions, wherein
the rotating mechanism:
rotates the first reading unit around a first rotation axis, as viewed in a direction orthogonally intersecting the opening direction of the medium, so that the first reading unit is positioned between a first horizontal position and a first inclined position, the first horizontal position, where a perpendicular line of the first placement surface in the horizontal state is parallel to a first optical axis of the first image reading unit, the first optical axis between the first reading unit and the placement table, and where the first image reading unit reads at least the medium opposite to the first placement surface in the horizontal state, the first inclined position where a perpendicular line of the second placement surface in the inclined state is parallel to the first optical axis and where the first image reading unit reads at least the medium opposite to the second placement surface in the inclined state; and
rotates the second reading unit around a second rotation axis, as viewed in a direction orthogonally intersecting the opening direction of the medium, so that the second reading unit is positioned between a second horizontal position and a second inclined position, the second horizontal position, where the perpendicular line of the second placement surface in the horizontal state is parallel to a second optical axis of the second image reading unit, the second optical axis between the second reading unit and the placement table, and where the second image reading unit reads at least the medium opposite to the second placement surface in the horizontal state, the second inclined position where the perpendicular line of the first placement surface in the inclined state is parallel to the second optical axis and where the second image reading unit reads at least the medium opposite to the first placement surface in the inclined state, and an area read by the first image reading unit partially overlap with an area read by the second image reading unit in the horizontal state and the inclined state of the placement table.

2. The image reading apparatus according to claim 1, wherein
the first reading unit includes a first mirror having a rotation axis parallel to the opening direction of the medium,
the first image reading unit reads the medium while the first optical axis is moved in a direction orthogonally intersecting the opening direction of the medium by rotation of the first mirror,
the second reading unit includes a second mirror having a rotation axis parallel to the opening direction of the medium, and
the second image reading unit reads the medium while the second optical axis is moved in a direction orthogonally intersecting the opening direction of the medium by rotation of the second mirror.

3. The image reading apparatus according to claim 2, wherein
the first reading unit includes a first optical path length changing mechanism that changes, in synchronization with the rotation of the first mirror, an optical path length between the first mirror and the first image reading unit, and
the second reading unit includes a second optical path length changing mechanism that changes, in synchronization with the rotation of the second mirror, an optical path length between the second mirror and the second image reading unit.

4. The image reading apparatus according to claim 1, further comprising an illumination that irradiates, with light, the medium placed on the placement table, wherein
a position irradiated by the illumination, the position on the medium placed on the placement table, changes in synchronization with a positional change of the first optical axis and the second optical axis, with respect to the medium placed on the placement table.

* * * * *